United States Patent
Ariel et al.

(10) Patent No.: US 10,726,737 B2
(45) Date of Patent: Jul. 28, 2020

(54) MULTI-SENSORY LITERACY ACQUISITION METHOD AND SYSTEM

(71) Applicant: Intellivance, LLC, South Daytona, FL (US)

(72) Inventors: Donald Ariel, Port Orange, FL (US); Vincent Dappio, Port Orange, FL (US); Daniel Ortiz, Port Orange, FL (US); Jeremiah Driscoll, South Daytona, FL (US); Heather Mullins, Satellite Beach, FL (US); Christopher Strickland, Port Orange, FL (US)

( * ) Notice: Subject to any disclaimer, the term of this patent is extended or adjusted under 35 U.S.C. 154(b) by 35 days.

(21) Appl. No.: 16/311,481

(22) PCT Filed: Nov. 26, 2017

(86) PCT No.: PCT/US2017/063205
§ 371 (c)(1),
(2) Date: Dec. 19, 2018

(87) PCT Pub. No.: WO2018/098406
PCT Pub. Date: May 31, 2018

(65) Prior Publication Data
US 2019/0213905 A1 Jul. 11, 2019

Related U.S. Application Data

(60) Provisional application No. 62/426,777, filed on Nov. 28, 2016.

(51) Int. Cl.
*G09B 15/02* (2006.01)
*G09B 5/00* (2006.01)
(Continued)

(52) U.S. Cl.
CPC ............. *G09B 15/023* (2013.01); *G09B 5/00* (2013.01); *G09B 5/065* (2013.01); *G10H 1/0016* (2013.01);
(Continued)

(58) Field of Classification Search
CPC ........ G09B 15/023; G09B 5/00; G09B 5/065; G10H 1/0016; G10H 2210/091;
(Continued)

(56) References Cited

U.S. PATENT DOCUMENTS

D362,643 S      9/1995  Svast
5,855,483 A *   1/1999  Collins ............... A63F 3/00643
                                                        434/322

(Continued)

*Primary Examiner* — David S Warren
*Assistant Examiner* — Christina M Schreiber
(74) *Attorney, Agent, or Firm* — Lori Sandman, Esq.

(57) ABSTRACT

The present invention discloses a system comprising a method and apparatus that integrates learning across interchangeable, multiple literacies and provides a means for increasing simultaneous literacy acquisition density. Information acquired through multiple senses results in more information acquired faster and with longer retention possible. The system presents information selectively through one or more sensory pathways, then interprets behavioral responses to this information, analyzing the responses qualitatively and quantitatively. Tracked and stored data is applied over various learning environments to develop individual learner profiles. In this way, the specific sensory pathways that an individual learner responds to can be optimized and specifically tailored for enhanced learning performance.

25 Claims, 20 Drawing Sheets

(51) Int. Cl.
  *G09B 5/06* (2006.01)
  *G10H 1/00* (2006.01)
(52) U.S. Cl.
  CPC . *G10H 2210/091* (2013.01); *G10H 2220/096* (2013.01); *G10H 2220/106* (2013.01); *G10H 2220/151* (2013.01)
(58) Field of Classification Search
  CPC ....... G10H 2220/096; G10H 2220/106; G10H 2220/151
  See application file for complete search history.

(56) References Cited

U.S. PATENT DOCUMENTS

| | | | | |
|---|---|---|---|---|
| 6,026,322 | A * | 2/2000 | Korenman | A61B 5/0017 600/547 |
| D440,900 | S | 4/2001 | Hillis | |
| 6,898,153 | B1 * | 5/2005 | Della Rossa | G04C 21/12 368/272 |
| 8,119,896 | B1 * | 2/2012 | Smith | G09B 15/00 84/470 R |
| D703,569 | S | 4/2014 | Jones | |
| D706,647 | S | 6/2014 | Jacques | |
| 9,245,455 | B2 * | 1/2016 | Noddings | G09B 15/023 |
| 9,333,418 | B2 * | 5/2016 | Lee | G09B 15/00 |
| D769,761 | S | 10/2016 | van Buuren | |
| 2002/0106617 | A1 * | 8/2002 | Hersh | A61B 5/16 434/236 |
| 2006/0107819 | A1 * | 5/2006 | Salter | G09B 5/06 84/470 R |
| 2006/0196343 | A1 * | 9/2006 | Yung | G09B 15/00 84/470 R |
| 2008/0102424 | A1 * | 5/2008 | Holljes | A63F 13/53 434/247 |
| 2009/0317779 | A1 * | 12/2009 | Brazil | G09B 19/00 434/236 |
| 2011/0256520 | A1 * | 10/2011 | Siefert | G09B 5/10 434/322 |
| 2011/0294107 | A1 * | 12/2011 | Wellard | G09B 19/08 434/365 |
| 2012/0258436 | A1 * | 10/2012 | Lee | G09B 19/00 434/362 |
| 2014/0220520 | A1 * | 8/2014 | Salamini | A61B 5/103 434/185 |
| 2014/0260901 | A1 * | 9/2014 | Lasko | G09B 15/00 84/470 R |
| 2014/0349267 | A1 * | 11/2014 | Thornton | G09B 23/02 434/276 |
| 2015/0297109 | A1 * | 10/2015 | Garten | A61B 5/04012 600/544 |
| 2017/0018202 | A1 * | 1/2017 | Marradi | G09B 15/08 |
| 2017/0263143 | A1 * | 9/2017 | Venkataratnam | G09B 19/04 |
| 2018/0374383 | A1 * | 12/2018 | Thielen | G09B 5/06 |
| 2019/0213905 | A1 * | 7/2019 | Ariel | G09B 5/00 |
| 2019/0371142 | A1 * | 12/2019 | Carter | G08B 13/19669 |

* cited by examiner

Fig. 2f

| Integer | Color Block | Degree | Note Name | Shapes | Exponent | Binary | Dice |
|---|---|---|---|---|---|---|---|
| 12 | | I | C | | | 0 0 0 0 | |
| 1 | | ii | C#/Db | | | 0 0 0 0 | |
| 2 | | II | D | | | 0 0 0 0 | |
| 3 | | iii | D#/Eb | | | 0 0 0 0 | |
| 4 | | III | E | | | 0 0 0 0 | |
| 5 | | IV | F | | | 0 0 0 0 | |
| 6 | | v | F#/Gb | | | 0 0 0 0 | |
| 7 | | V | G | | | 0 0 0 0 | |
| 8 | | vi | G#/Ab | | | 0 0 0 0 | |
| 9 | | VI | A | | | 0 0 0 0 | |
| 10 | | vii | A#/Bb | | | 0 0 0 0 | |
| 11 | | VII | B | | | 0 0 0 0 | |

Fig. 2g

| Chromatic Integer | Diatonic Integer | Color Block | Chromatic Degree | Diatonic Degree | Interval (to Tonic) | Note Name | Modes | Triads | Tetrad | Diatonic Shapes |
|---|---|---|---|---|---|---|---|---|---|---|
| 12 | 1 | ☐ | I | I | Tonic | C | Ionian | Major | Major 7 | ● |
| 1 |   |   | ♭ii |   | minor 2nd | C#/Db |   |   |   |   |
| 2 | 2 | ▦ | II | ii | Major 2nd | D | Dorian | minor | minor 7 | ⬤⬤ |
| 3 |   |   | ♭iii |   | minor 3rd | D#/Eb |   |   |   |   |
| 4 | 3 | ▦ | III | iii | Major 3rd | E | Phrygian | minor | minor 7 | ◀ |
| 5 | 4 | ▦ | IV | IV | Perfect 4th | F | Lydian | Major | Major 7 | ■ |
| 6 |   |   | ♭v |   | Tritone | F#/Gb |   |   |   |   |
| 7 | 5 | ▦ | V | V | Perfect 5th | G | Mixolydian | Major | Dominant 7 | ♣ |
| 8 |   |   | ♭vi |   | minor 6th | G#/Ab |   |   |   |   |
| 9 | 6 | ▦ | VI | vi | Major 6th | A | Aeolian | minor | minor 7 | ⋈ |
| 10 |   |   | ♭vii |   | minor 7th | A#/Bb |   |   |   |   |
| 11 | 7 | ▨ | VII | vii | Major 7th | B | Locrian | diminished | half diminished | ◆ |

Fig. 7 b1
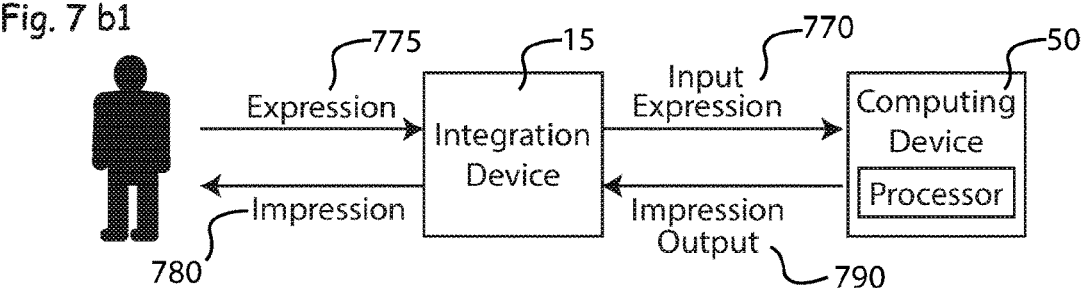
Fig. 7 b2
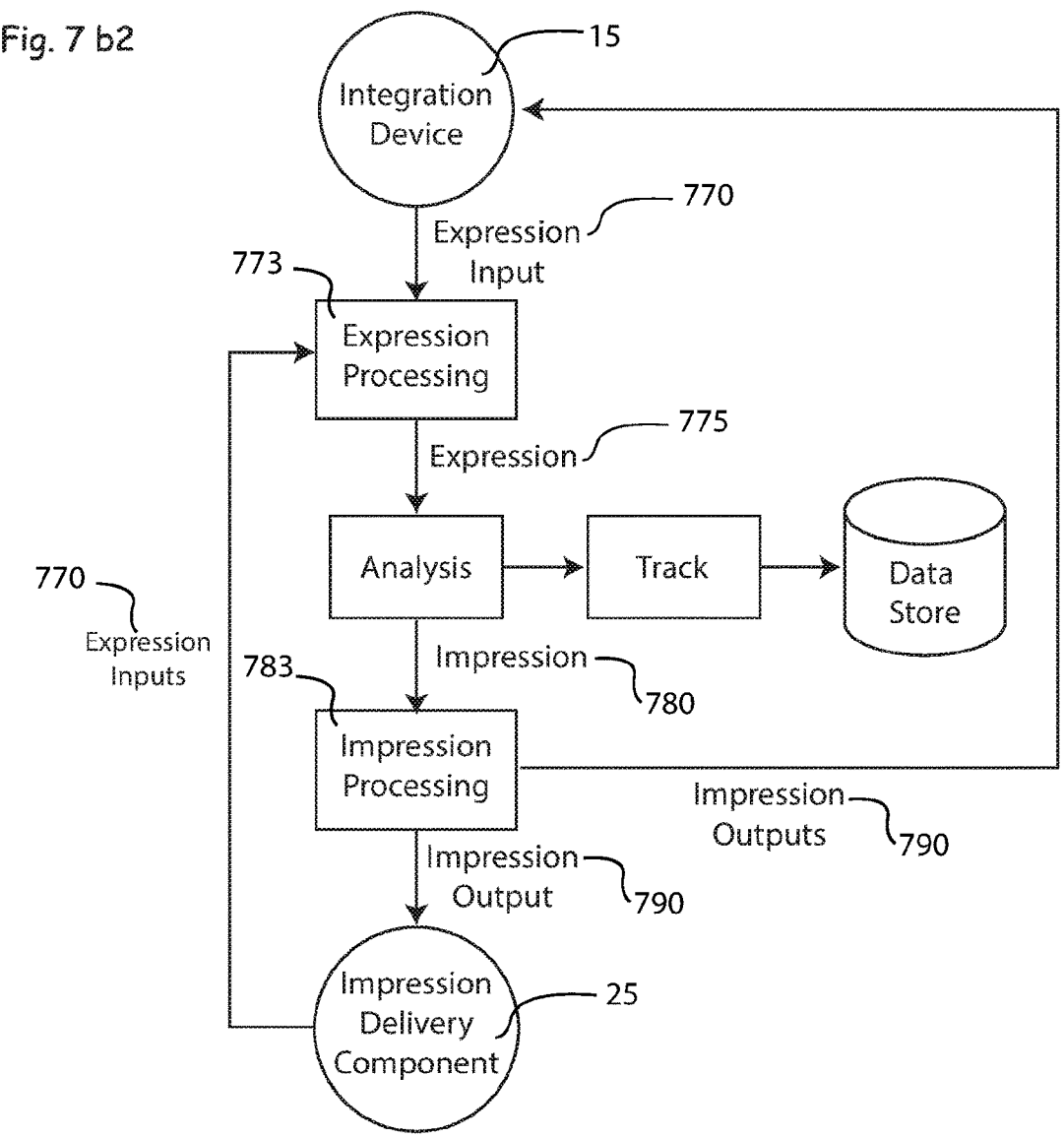
Fig. 7 b3
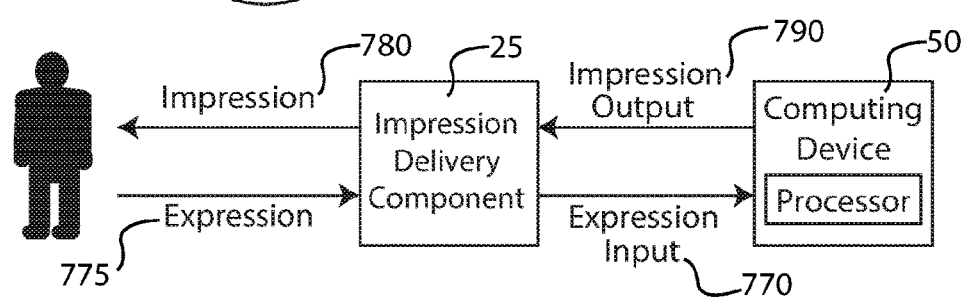

MULTI-SENSORY LITERACY ACQUISITION METHOD AND SYSTEM

CROSS-REFERENCE TO RELATED APPLICATIONS

This application claims priority to United States Provisional Application for Patent Ser. No. 62/426,777, filed 28 Nov. 2016.

STATEMENT REGARDING FEDERALLY SPONSORED RESEARCH/DEVELOPMENT

Not applicable.

REFERENCE TO SEQUENCE LISTING, A TABLE, OR COMPUTER PROGRAM LISTING COMPACT DISC APPENDIX

Not applicable.

TECHNICAL FIELD

The present invention relates generally to the field of education, and more specifically to methodology, technology and techniques for leveraging an individual learner's optimal learning style. The system incorporates multi-sensory delivery and response capture tools which operate within learning environments, enabling enhanced literacy acquisition. As used herein, literacy refers to competency or knowledge in a particular area, including linguistic, visual, auditory, gestural, spatial and multimodal intelligence. Acquisition of one or more literacies occurs concurrently over a wide range of individual subjects, including but not limited to musical, mathematical, scientific, linguistic and other learning areas. By integrating multiple literacies into the learning process simultaneously, the system increases learning speed, retention and comprehension. The tools, method and system disclosed herein also facilitate identification of a person's most receptive sensory pathways for information acquisition, and enable delivery of that information to the identified pathways in real time.

BACKGROUND

Various learning devices and methodologies have been disclosed and used for cognitive development targeting specific learning outcomes. For example, prior art disclosing music, language, or mathematical instruction tools and methods that provide information feedback to improve learning behaviors are abundant. Related art teaches music through visualization, and in a number of disclosures a circular configuration is used to present music notes and corresponding intervals, which may be color-coded or arranged in patterns to organize the information presented. Methods or systems for studying music have been defined that associate patterns of information with tablature including shapes and color-coding integrated with various instruments. Also, systems of music education across various instruments, using chromatic patterns of notes, chords and musical information with color and assorted spatial arrangements exist. Further, musical instruction where a user learns to play a pre-selected musical instrument by incrementally increasing the difficulty of practicing a musical piece have been used, which may incorporate diagrams presented through audio and visual software on a display device at varying difficulty levels.

Adaptive training systems also exist, which disclose methodology to assess a learner's understanding of specific subject matter and learning style by presenting and reviewing various teaching strategies, and identifying the best strategy for learning. Related art discloses computer programs for time and content tracking, and also learning systems for self-learning of language or other subjects in real time, in a textual content based learning environment.

These and related existing disclosures and inventions typically operate on a specific learning output; that is, they teach music, or language, or math, with a single subject focus. Generally, they contemplate learning devices, methods or systems that instruct in a single literacy, which is typically delivered through a specific sensory pathway (ie., perceived through one of the five senses including seeing, hearing, tasting, smelling, touching). What is needed is a way to harness emerging technology to learn more, faster. New tools, strategies and learning systems are required that support intelligence acquisition across multiple literacies using optimized sensory delivery.

ADVANTAGES OF THE INVENTION

Technological advances in audio, video, haptic and augmented environments have made it possible to approach education differently than the traditional book and pencil, single subject focus. The present invention provides a device, method and system that integrates learning across interchangeable, multiple literacies and provides a means for increasing simultaneous literacy acquisition density. Applicant's research in conjunction with data from other researchers shows that information acquired through multiple senses results in more information acquired faster and with longer retention possible. This invention presents information through multiple senses, then interprets responses or reactions to this information, and further analyzes the response qualitatively and quantitatively to develop individual learner profiles. In this way, the specific sensory pathways that an individual learner responds to can be optimized and specifically tailored for enhanced learning performance. It allows for instant, multi-sensory feedback and tracking with the ability for an instructor or administrator to monitor and pivot informational presentation from one or more students, in real time, across multiple senses.

The invention disclosed herein can be used as a stand-alone system for teaching and learning, or it can be integrated into existing and established learning management systems. These and other features of the invention will be more readily understood upon consideration of the attached drawings and of the following detailed description of those drawings and the presently-preferred and other embodiments of the invention.

REFERENCE NUMERALS USED IN THE DRAWINGS

10 STREAM Engine
15 Integration Device
20 Integrated musical instrument (IMI)
22 Multi-player integration device
25 Impression delivery component (IDC)
26 Interactive display
27 Auxiliary interactive display
30 Litbits
32 Multi-sensory cognitive object (MSCO)
33 Prime color object
34 Basic color block construct 40 Data capture, storage and sorting component
50 Processor
60 Sensory pathways
70 Curricula pivot and targeting
80 Learner profile
90 Input connection port
95 Input/output ports
98 Integrated keyboard playing surface
100 Speakers for audio output
101 Impression delivery code
102 Sensory modification code
103 Environmental rules
301 literacy selection
305 impression delivery object selection
310 association of literacy information with impression delivery
312 mapping information and data associations to software
315 MSCO layering and pattern organization
701 Initial State
702 Running State
703 End State
710 Present environmental options
720 Track and store environmental selections
730 Initialize running environment
740 Data Store
750 Post Analysis
760 Learner profile generation
770 Expression input
773 Expression processing
775 Expression
780 Impression
783 Impression processing
790 Impression output
920 Capture and data store display
930 Instructor and the learner identification
940 Current and completed lesson information
950 Sensory specific time and progress identification
960 literacy acquisition progress data

FIGURES OF THE DRAWINGS

FIG. 2(*h*) shows literacy stacking in series of 12 units.

FIGS. 7 (*a-c*) provide an illustration of the process flow for tracking, interpreting, and delivering impressions and expressions within the system.

Figure 8:
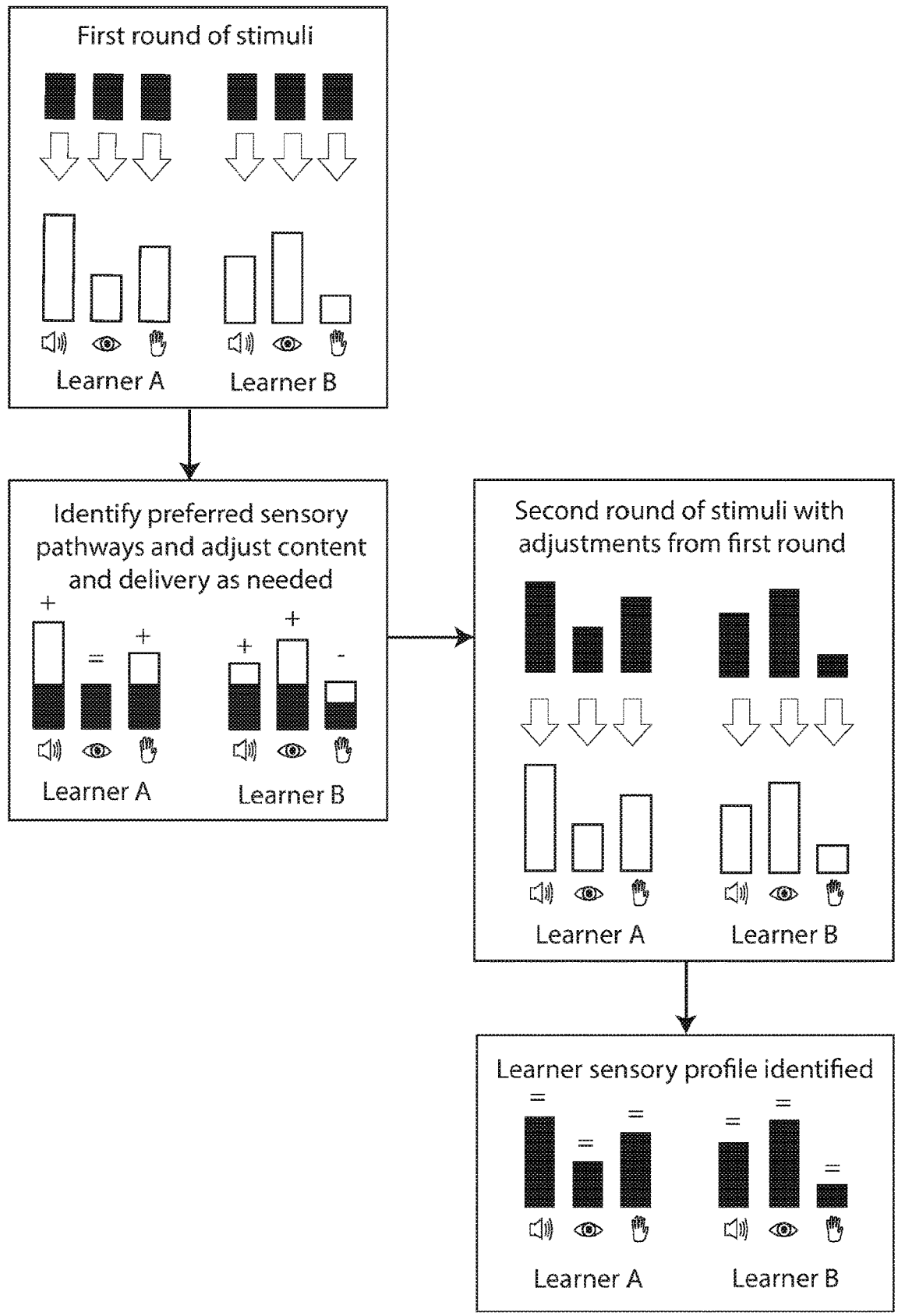

FIG. 8 shows the learning acquisition process as presented, captured and re-presented to the learner.

Figure 9:
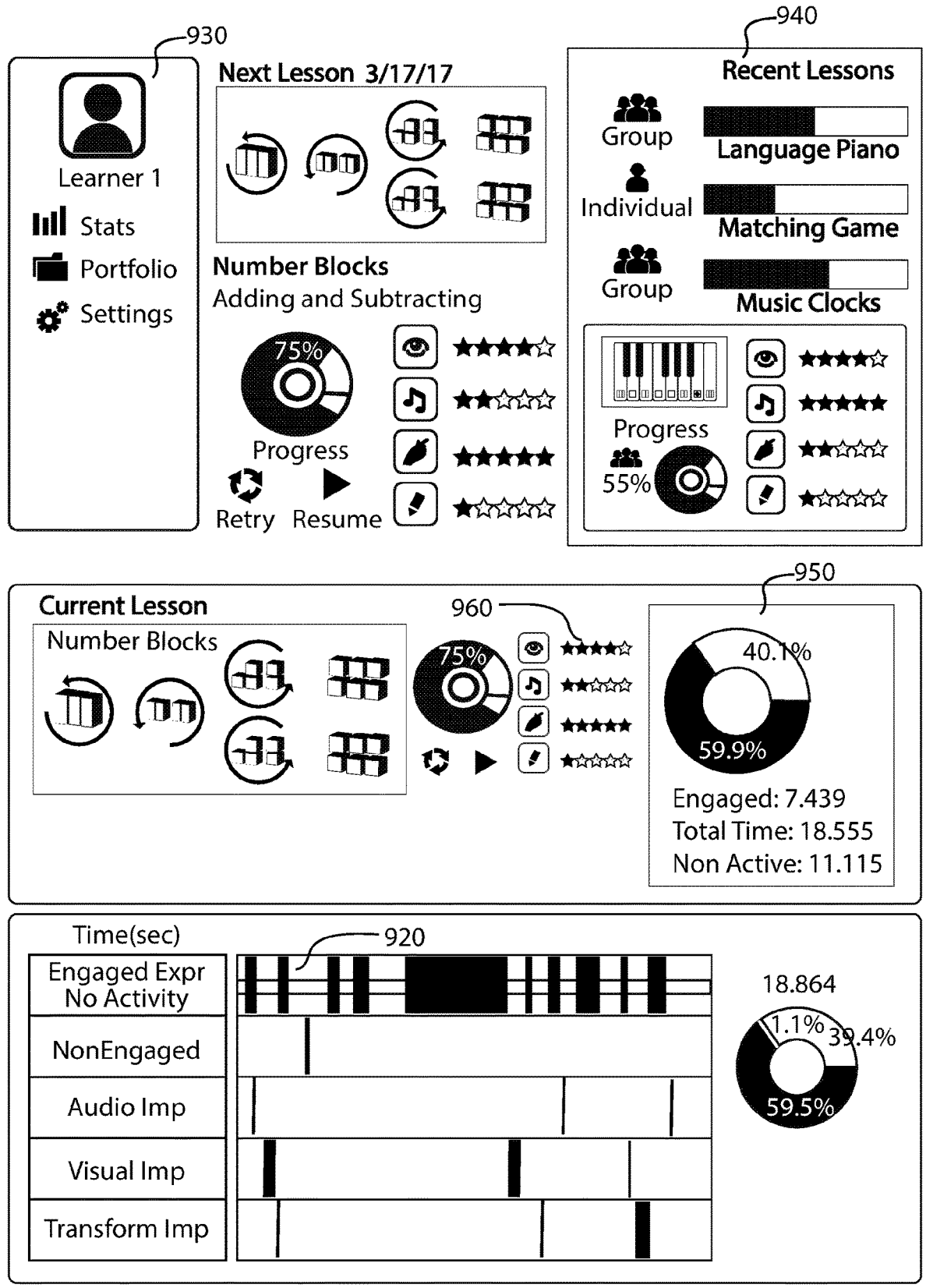

FIG. 9 illustrates an embodiment of a learner interface screen and examples of possible data tracking and expression feedback presentation.

DISCLOSURE OF THE INVENTION

The invention disclosed herein comprises a novel apparatus and method used within a system for cognitive and psychomotor assessment, training and development. The system is designed to provide evolving physical and cognitive educational tools for learning in a variety of settings and across many learning platforms. It is contemplated that instructors, developers and designers can present and publish changing content for the various learning environments containing lesson-specific experiences, incorporated within the system. In this way, the system can be used in creating and expanding understanding of math, language, music, and other literacies by establishing recognition of visual, audio and tactile components integrated in a common, multi-sensory "language".

The system utilizes a method and experiential tools that coordinate sensory input from multiple sensory pathways simultaneously to enable acquisition of the multi-sensory language. It provides users with a means to identify, recognize, process and act on individual pieces of information, then combine them for higher order cognition in a relatively easy to acquire manner. Individual sensory elements, or cognitive sensory bits ("litbits") are first associated across various senses. Litbits refer to individual pieces of information perceived through a single sense that are recognized and identified readily. They are capable of combination with other litbits, forming multisensory cognitive objects (MSCO's). These MSCO's, combining individually sensed litbits for composite, simultaneous recognition, are then integrated into a learning context, such as a clock, a music score or a periodic table, to extend and expand cognition and understanding of increasing complexity.

The present invention allows a user (for example, an instructor, course evaluator, learning group or individual learner) to first select environmental cues applicable within the learning context. Cues presented in basic constructs such as numbers, color, musical tones, shapes, tactile impulses or other sensory prompts, or various combinations of these, are selected by the user, and form the fundamental units of the system. These fundamental units, the litbits, are then associated with organized prime and non-prime numbers in patterns, to form combined, multi-sensory units, the MSCO's. Allowing a learner to individually ascribe attributes to the basic units allows for immersion through reinforcement of the cognitive associations, establishing recognition and a foundation on which to build the more complex learning architecture within the context of the system.

As the learner becomes familiar with the individual libits, their prime and non-prime number associations and their various combinations into MSCO's through immersion in the system, consistent patterns emerge and are recognized. In this way, a multi-sensory language develops. By experiencing multiple sensory inputs simultaneously and learning to associate them with a particular outcome, a consistent cognitive response develops. The various sensory inputs can be combined, re-associated and re-combined into multiples of the individual litbits, and their combined MSCO's. With continued use, the learner can recognize and comprehend increasingly complex combinations of the individual litbits rapidly. This recognition of the various sensory components individually and their associations in combination enhance the perception speed, accuracy and depth of understanding of the user.

It is an object of this invention to provide a personalized, individually-targeted learning experience. This is accomplished by presenting, in multiple senses simultaneously, personally selected and recognized patterns of information. The invention provides an adaptable format for organized presentation of information, connected with the experiential learning system claimed. Multi-sensory experiences are presented to the learner to form impressions; the learner assimilates these impressions to acquire and develop simultaneous multiple expressive behavioral responses, or expressions. Both the impressions delivered and the expressed responses are captured qualitatively and quantitatively, and logged as part of the learner's individual learner profile to continuously improve targeted knowledge and psychomotor skills acquisition.

It is a further object of this invention to provide a method to stack interchangeable multiple literacies by organizing them in patterns derived from one or more sets of integrated basic constructs. The learner can simultaneously comprehend stacked, layered, multiple bits of information as a function of its organization into patterns from these basic constructs, and can also expand comprehension because the experience is from multiple senses simultaneously.

It is a different object to provide educational and learning methodology that can be used by individuals at any level of cognitive or physically ability, including specifically those who are sensory challenged, learning disabled or have other specific cognitive, physical or psychomotor constraints.

It is another, different object of this invention to facilitate education by providing instructors and educational program administrators with a system to deliver targeted instruction with defined outcomes and analytical tools that can assist with the development and deployment of enhanced IEP's.

It is also an object of this invention to provide the apparatus and integrated system and circuitry to support a method of intelligence acquisition comprising one or more of the following:
1. cognitive association: pairing or establishing equivalents between individual and/or different sensory inputs such as a visual element (the number 6) with an auditory element (the note D) with a tactile input (stimulation of the index finger inside a haptic actuator). These are examples of individual literacy units referred to as litbits.
2. combining individual literacy units (litbits) into one object to express a single multiple sensory cognitive object; for example, a number with a color with a music note with an audio wave pitch frequency, etc. for a combined multi-sensory cognitive object.
3. Immersion through reinforcement of the cognitive associations by presentation and interaction in and with multiple sensory pathways. This might be active (such as building the connections between litbits, creating a musical score using litbit equivalents, populating a periodic table of elements with audio or visual equivalents) or passive (such as watching a video presentation or listening to a sound recording).
4. Introduction of layered sensory experience targeted to a learning outcome; reintroducing the experience in different sensory pathways and tracking the engagement, acquisition and retention of the desired learning outcomes.
5. Focusing the training methodology by selecting for the sensory pathway or pathways the user responds to most effectively.

The method, apparatus and system disclosed herein may be initiated by cataloging, then organizing information into patterns. Organization is accomplished by first associating basic components of the information, the litbits 30, with reoccurring patterns of prime and non-prime numbers. These patterns are used to connect simple, then increasingly complex pieces of information. Information may be first presented to a learner in a physical format, such as on paper, or can be delivered electronically, for example on a digital interface. In one or more embodiments, the learner is exposed to concept subparts, the litbits 30, first in one, then coupled with a second sensory pathway, then simultaneously through multiple senses; immersion in this way reinforces cognitive and physical associations. As instant recognition of individual litbits 30 acquired through multiple senses develops, additional information is layered, or stacked, upon the patterns, so that instant recognition of increasingly complex information results. The stacked information is coupled with physical, cognitive or psychomotor expressive behavior capable of assessment by the system. The system then assesses the output against expected or desired expressive behavior, modifies content delivery, and re-presents the information in alternate sensory pathways, with or without modified content.

Figure 1:
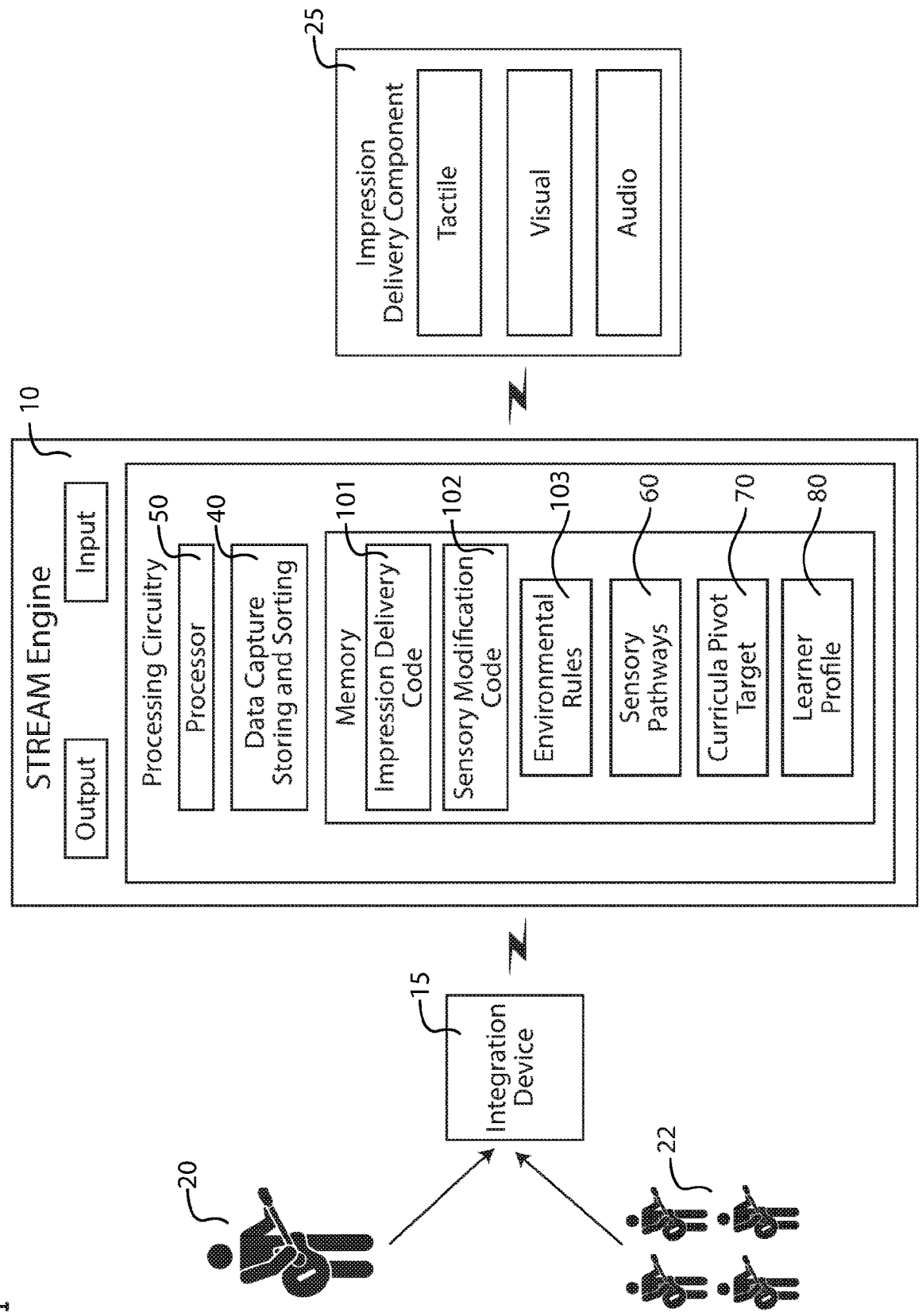
FIG. 1 is a diagram illustrating an overview of the system comprising the STREAM Engine and the various hardware components connected within the system.

A summary of the one or more aspects of the invention is presented in FIG. 1, and further detailed in the drawing figures that follow. In FIG. 1, a flow view of the STREAM Engine 10 and hardware comprising the apparatus integrated within the system is shown. A computing device capable of sorting and storing data and programmed with the system software is connected to and integrated with the various hardware components comprising the invention. The computing device and software utilized with the system are referred to as the STREAM Engine 10, an acronym for Science. Technology. Rhythm. Engineering, and Mathematics. Capturing expressive behavior is accomplished utilizing an integration device 15. In one embodiment, one type of integration device, a musical instrument or a simulator of a musical instrument capable of integration with the system, hereinafter IMI 20, is used. In addition to the musical instrument embodiment, other performance-based embodiments of an integration device 15 are contemplated. Additionally, multiple players can be connected through a multi-player integration device 22, which provides for simultaneously capturing, recording and displaying content from one or more IMI's 20 from more than one learner concurrently. In this way, a musical group or class can play and learn together on a variety of instruments in real time. Embodiments of the IMI 20 and connection to the system are depicted in FIG. 5. One skilled in the art would recognize that the particular type of instrument (stringed instruments, percussion, wind, reed or other) can be changed, interchanged, or combined with other instruments within the context of this disclosure, and that virtual instruments or simulators such as computer or touchscreen actuated keyboards, fretboards or percussive instruments are contemplated.

The IMI 20 in the figures may be inlaid or overlaid with indicia comprising litbits, which are individual pieces of information perceived through a single sense. Visual litbits 30, in the form of information perceived visually, can be associated with specific music tones, blending visual (i.e., colored indicia) with audio (i.e., tones of the fretted fingerboard) cues; lighting, touch-actuation, and sound capacity can be associated with the inlays or overlays. The IMI 20 and the STREAM Engine 10 are connected so that signal from the IMI 20 can be recorded and analyzed through the expression processor component 50. Standard and commercially-available instruments can be equipped for integration with the system by adding inlays or overlays and connectivity to the STREAM Engine 10; specifically integrated and programmed instruments that are purchased with the system loaded and inlayed or overlaid are also contemplated.

The Stream Engine 10 is also connected with an impression delivery component 25. This impression delivery component 25 is chosen by the instructor or administrator and would comprise a familiar article, consistent with the lesson and capable of division into subparts. For example, a clock with moveably changeable hands animated by sound would deliver audio and visual impressions to the learner to teach math and music literacies simultaneously, either in a physical, digital, virtual, or augmented environment. The example of a clock embodiment of the impression delivery component 25 is used throughout this disclosure; in another embodiment, a periodic table of elements can be used to add science concepts, simultaneously delivered with music and mathematics, as illustrated in FIG. 4.

In one or more embodiments, the learner is immersed in sensory experiences through environments presenting games or learning modules incorporating a set of stimuli initially targeting a single sense. After understanding of the patterns and associated information is established within a first sensory pathway, such as recognizing shapes and colors through visual input, a second and then subsequent set of stimuli targeting other or multiple sensory pathways 60 are introduced. Then, a parallel literacy in one or more of the same sensory pathways 60 can be interwoven and presented to the learner, such as introducing an audio input for language (i.e., the visually recognized musical note is spoken in the appropriate musical tone in French). Finally, multiple literacies are experienced through multiple senses. In one or more embodiments, the instrumental and language literacies are incorporated into the understanding of the user along with a tactile input of interacting and playing with the instrument, so that physical and psychomotor skills can be integrated and developed. Further sensory introduction could include haptic feedback touchpad for touch sensory impression or other sensorial exposure. The system may also be configured for manual use (i.e, during introduction to the program, or in an acoustic or unplugged environment).

The STREAM Engine 10, in association with or connected to the integration device 15 (an IMI 20 in the embodiment presented) and the impression delivery component 25, captures the responses expressed by the user upon the IMI 20, and logs and stores the captured response data in the capture, storage and sorting component 40. Captured and stored data is then analyzed by the STREAM Engine 10 processor 50, which applies rules from one or more of the impression delivery code 101, sensory modification code 102, and environmental rules 103. This allows the system to determine the sensory pathway or pathways optimized for the learner, based on a set of pre-determined desired performance metrics as described in FIG. 7. STREAM Engine 10 then undertakes curricula pivot and target 70, redirecting the curricula through the optimized pathways, focusing presentation of information through the learner's strongest sensory pathways 60 for knowledge acquisition as described in FIG. 8. In one or more embodiments, the system is capable of perceiving and retaining the learner's best response pathways across increasingly complex information presentation, and is therefore adapted to define, through continued use, optimized sensory pathways 60 across multiple literacies, directly applicable and specific to the learner. By targeting and tracking literacy acquisition from one or more students, in real time, across multiple senses, a learner profile 80 can be assembled, stored and modified to provide an adapting, optimized learning strategy.

Figures 2A, 2B, 2C, 2D:
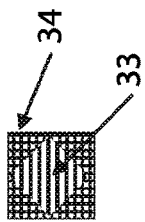
FIGS. 2 (*a-g*) show how litbits are cataloged, associated, and then integrated into a stacked learning language recognized by the user.

In FIGS. 2 (a-g), association of information constructs and pattern pairing are shown. Litbits 30 are cataloged, associated, and then integrated into the stacked learning language as MSCO's 32, which are readily recognized by the user because of the familiarity developed with the underlying litbits 30. In one or more embodiments, by way of example, colored blocks are used as basic constructs where different colors are represented by different hatch mark patterns. In FIG. 2(a) the color blocks are initially selected and matched with prime numbers and composite numbers to catalog them. For this illustration, six colors consisting of black, white, blue, red, yellow and green colors are chosen to represent the numbers 0, 1, and the prime numbers 2, 3, 5 and 7, respectively. By grouping color constructs in any combination and associating them with integers, the system can represent any other non-prime numbers in a factorial or multiplicative form of those numbers; this is illustrated by FIG. 2(b). The non-prime numbers can be represented by a combination of color constructs representing prime numbers 2, 3, 5 & 7 as well as being able to represent any further numbers by embedding a prime color object 33 inside of a basic color block construct 34. The prime color object 33 represents which of a stacked series of numbers are referred to; FIG. 2(d) represents this. FIG. 2(c) shows the ability to further pair litbit information, by incorporating shapes.

Figure 2E:
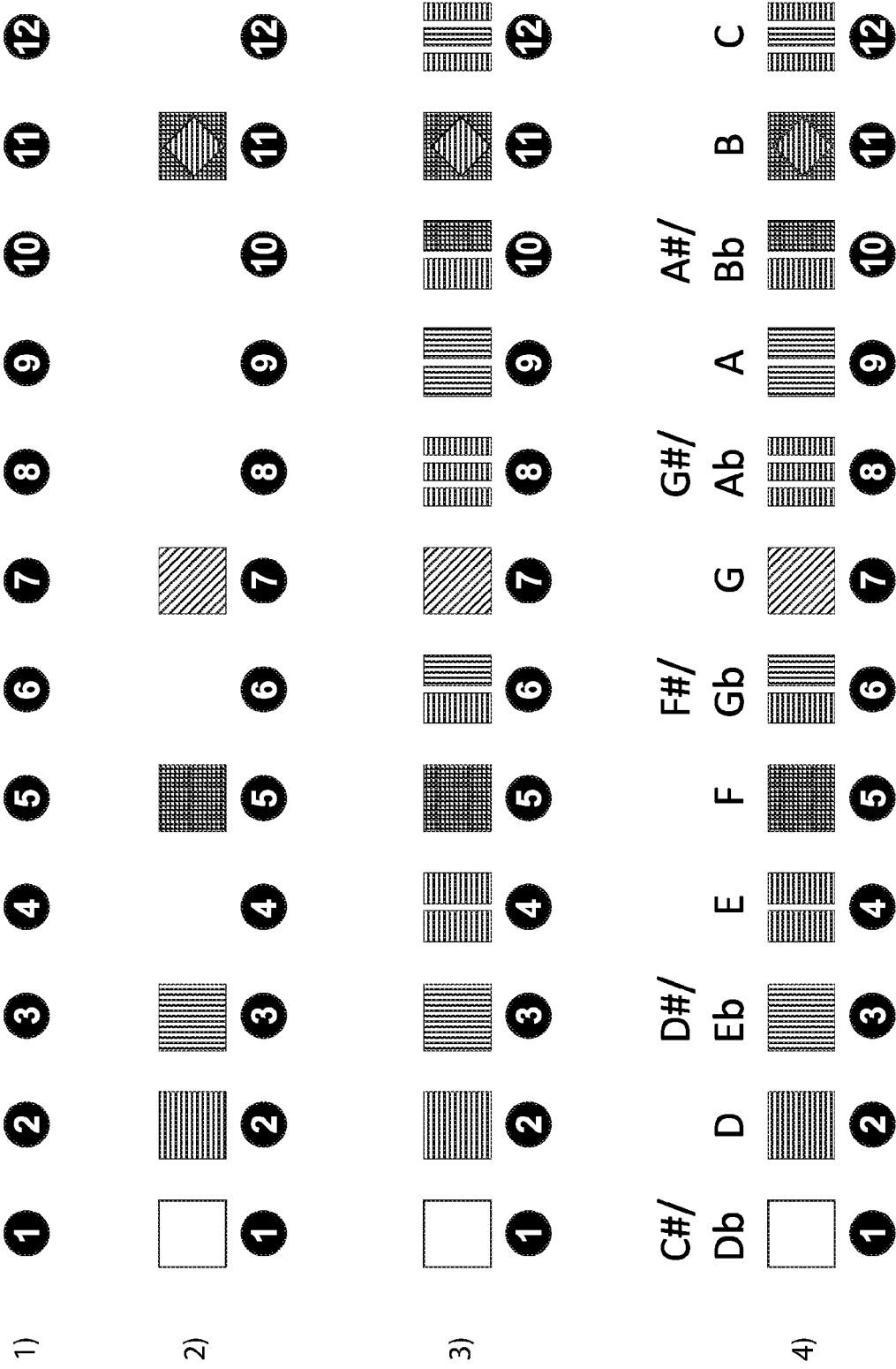

Once the litbit associations have been defined, patterns are organized. In one or more embodiments, integers are linearly represented along a continuous line, indefinitely, as shown in FIG. 2(e). In this figure: 1) numerals are arranged linearly; 2) prime number color blocks are added according to value; 3) non-prime number color blocks are constructed from multiples of the prime numbers; and 4) literacy is assigned (in this case music notes). If those integers are arranged in a series of 6 columns by folding the continuous integers after every $6^{th}$ integer in the linear integer continuum, stacked columns are formed. In order to build prime numbers infinitely within the system, the colors are spatially arranged within each construct to represent multiples or factors of the primary construct group. As shown in FIG. 2(d), basic color block construct 34 is determined by which column/series the number falls under (in the example below, 11 is in the second row of the 5/yellow column). The prime color object 33 tracks the row the number appears in. The color is determined by which prime instance in the column/series the number is (this model uses a blue object, because 1 is in the second row of the yellow column/series built on the number 5). All prime numbers greater than 7, infinitely, will line up with the columns/series built upon the numbers 5 & 7. This will hold true no matter which color combinations are applied to the method. By organizing integers greater than 1 in series of 6, all prime numbers greater than 3 will infinitely fall in the columns built on top of the numbers 5 & 7. This pattern will hold up regardless of which color combinations are applied. This process can also be expressed by the following rule:

All Prime Numbers>3 will never be found in the Series' 2+6, 3+6, 4+6, or 6+6

All Prime Numbers>3 will only be found in the Series' 5+6 & 7+6

In one or more embodiments, once each integer is associated with a color construct that can be expressed infinitely, the first litbits 30 have been established. These color and math associated bits of information can now be paired, combined, associated and re-associated with other litbits 30, forming information and literacy composites, or MSCO's 32 to build multiple dimensions of literacy and sensory information, which are simultaneously experienced and readily understood.

In one or more embodiments, additional formats besides color constructs for constructs are implemented; one skilled in the art would appreciate that a variety of sensory cues could be used. Shapes and sides can be used as another cataloging component in accordance with the principles of the invention. The logic behind applying shapes is that color constructs and/or chromatic or diatonic objects can be associated with shapes based on their total number of sides; this expands the number of litbits 30 that can be used to stack literacies upon, thereby allowing for more complex connected sensory and literacy recognition. FIG. 2(f) is a table showing one or more embodiments of how litbits 30 are cataloged and associated, and their relationship to each other. Various associated equivalencies that form the basic units upon which other literacies and their associated sensory cues are used to organize information.

Figure 2H:
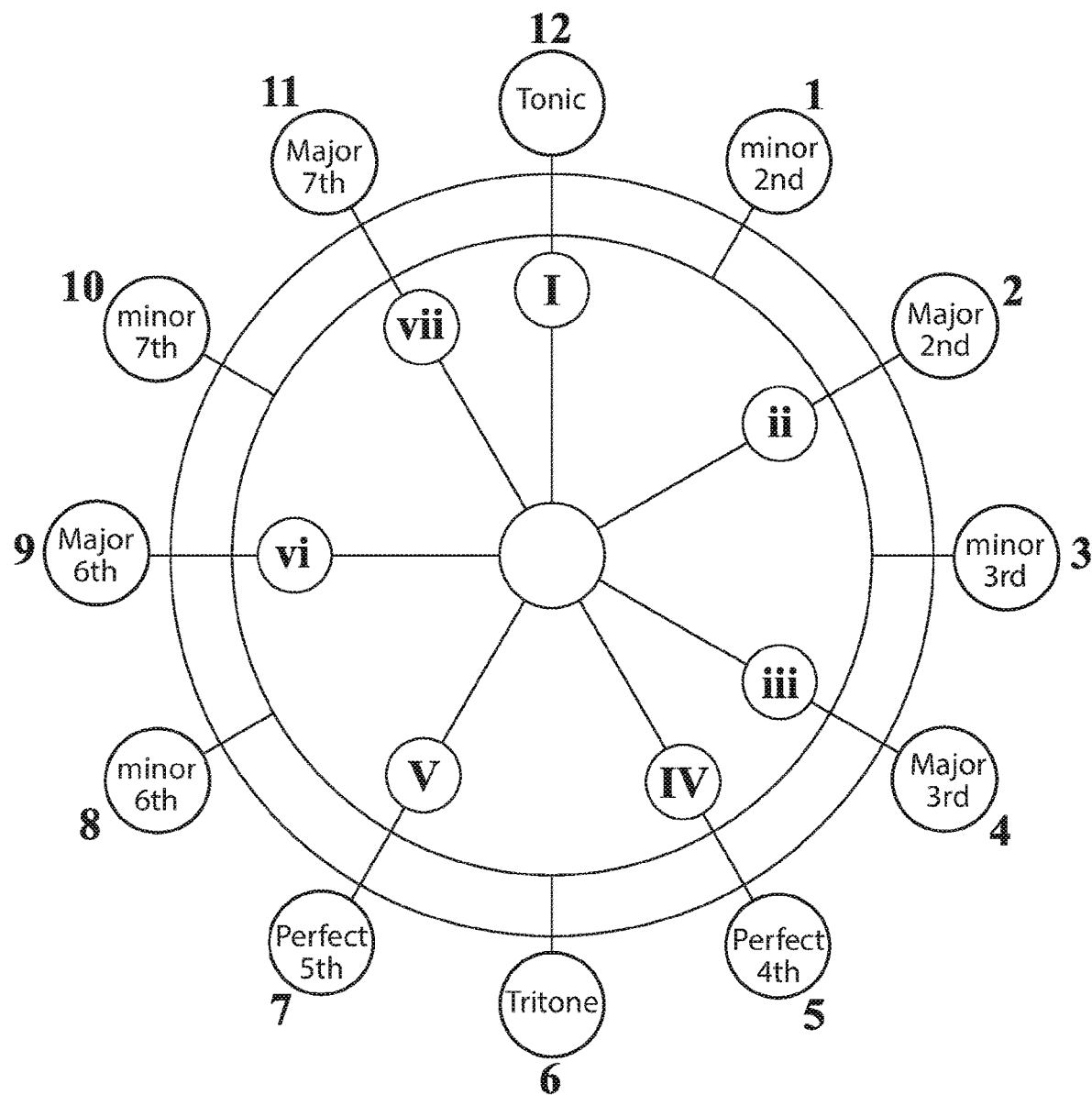
Figure 3A:
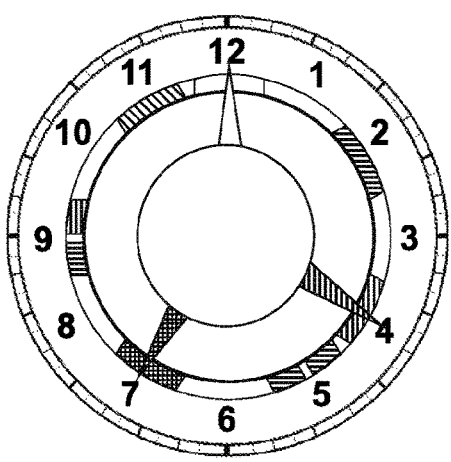
FIGS. 3 (*a-h*) illustrate the layering of information utilizing an impression delivery component in a clock form basic construct embodiment.
Figure 3B:
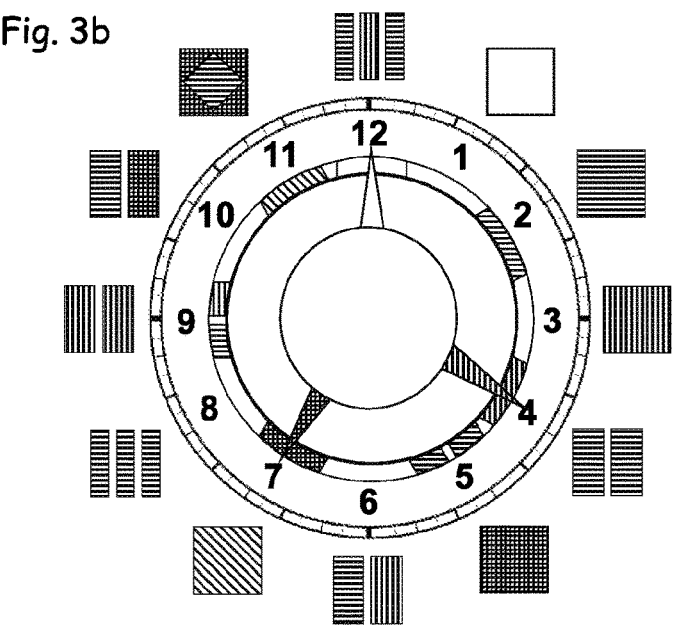
Figure 3C:
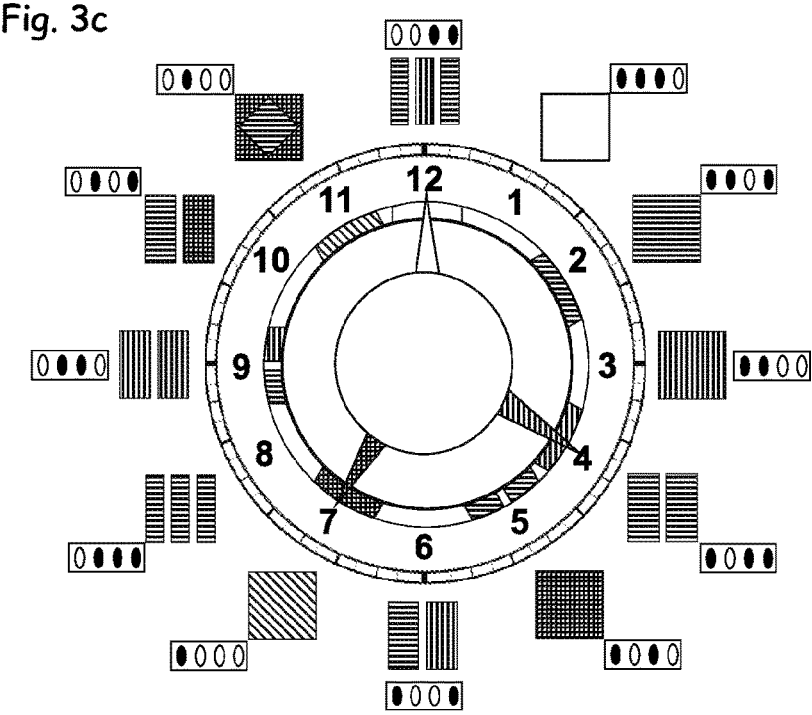
Figure 3D:
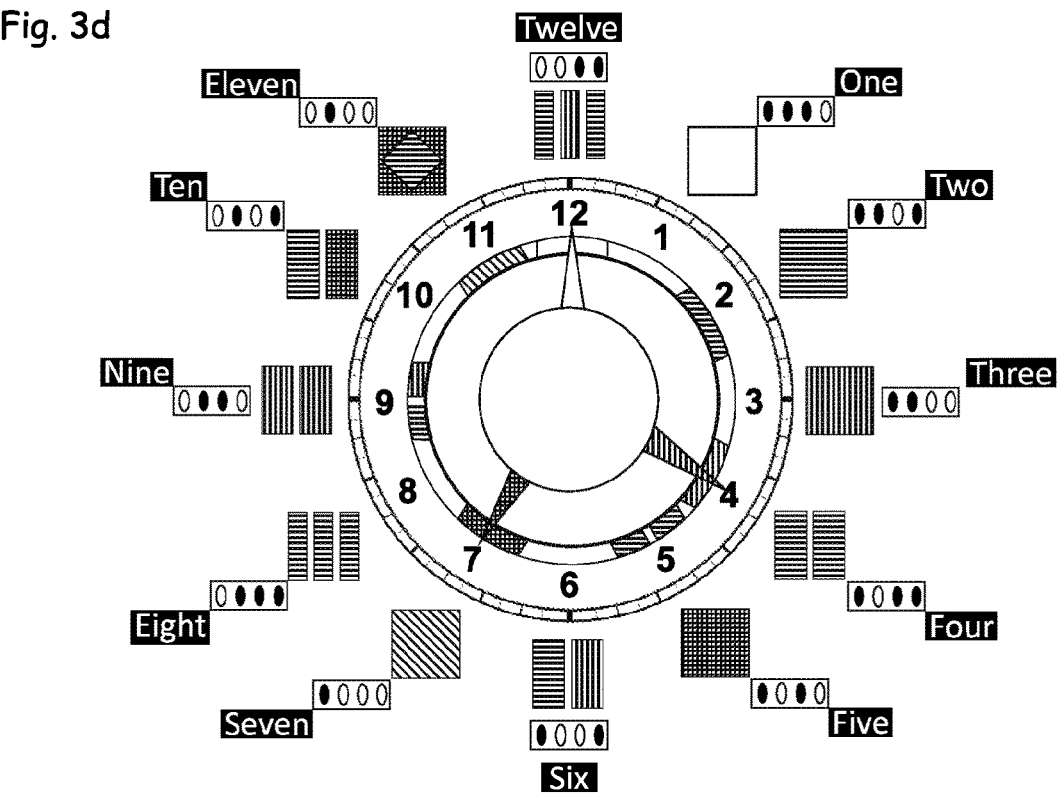
Figure 3E:
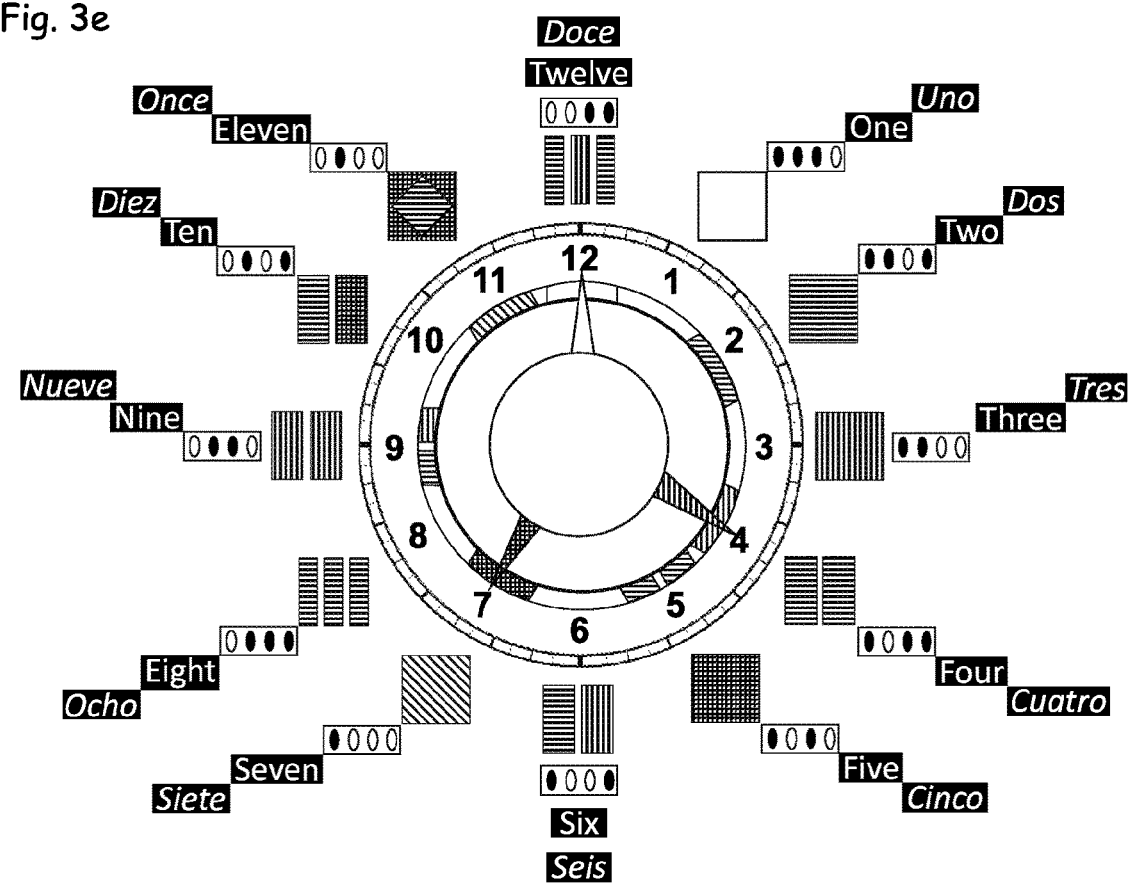
Figure 3F:
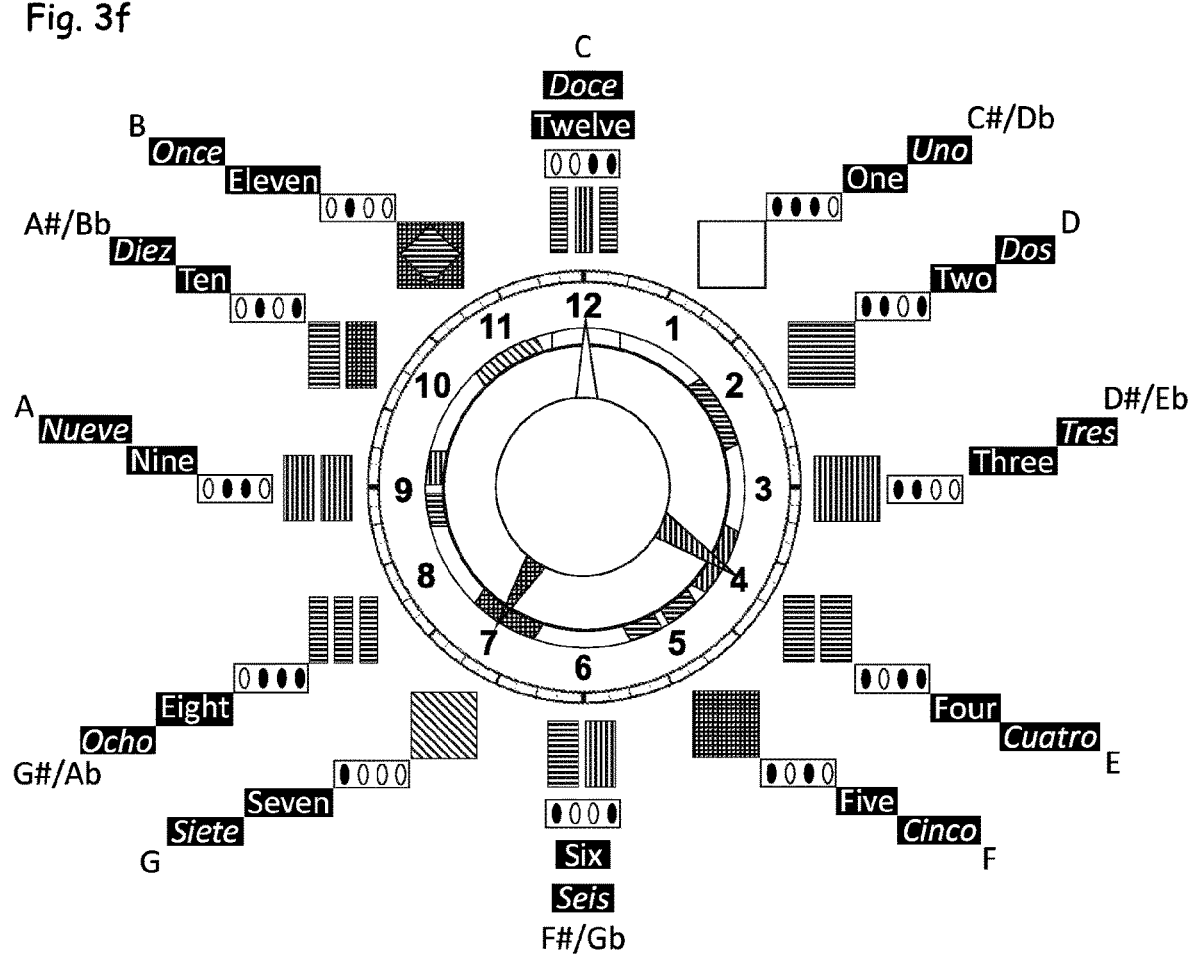
Figure 3G:
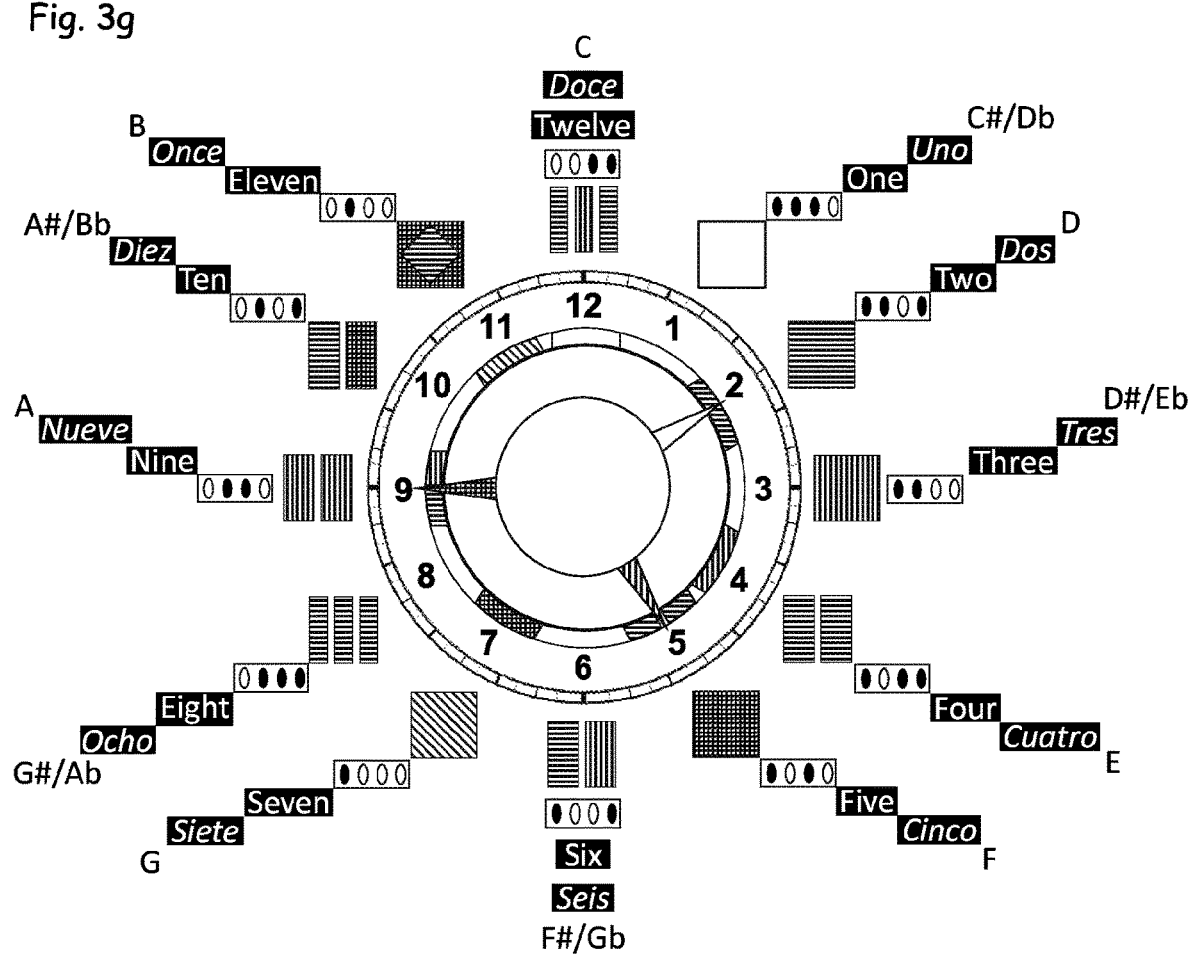
Figure 3H:
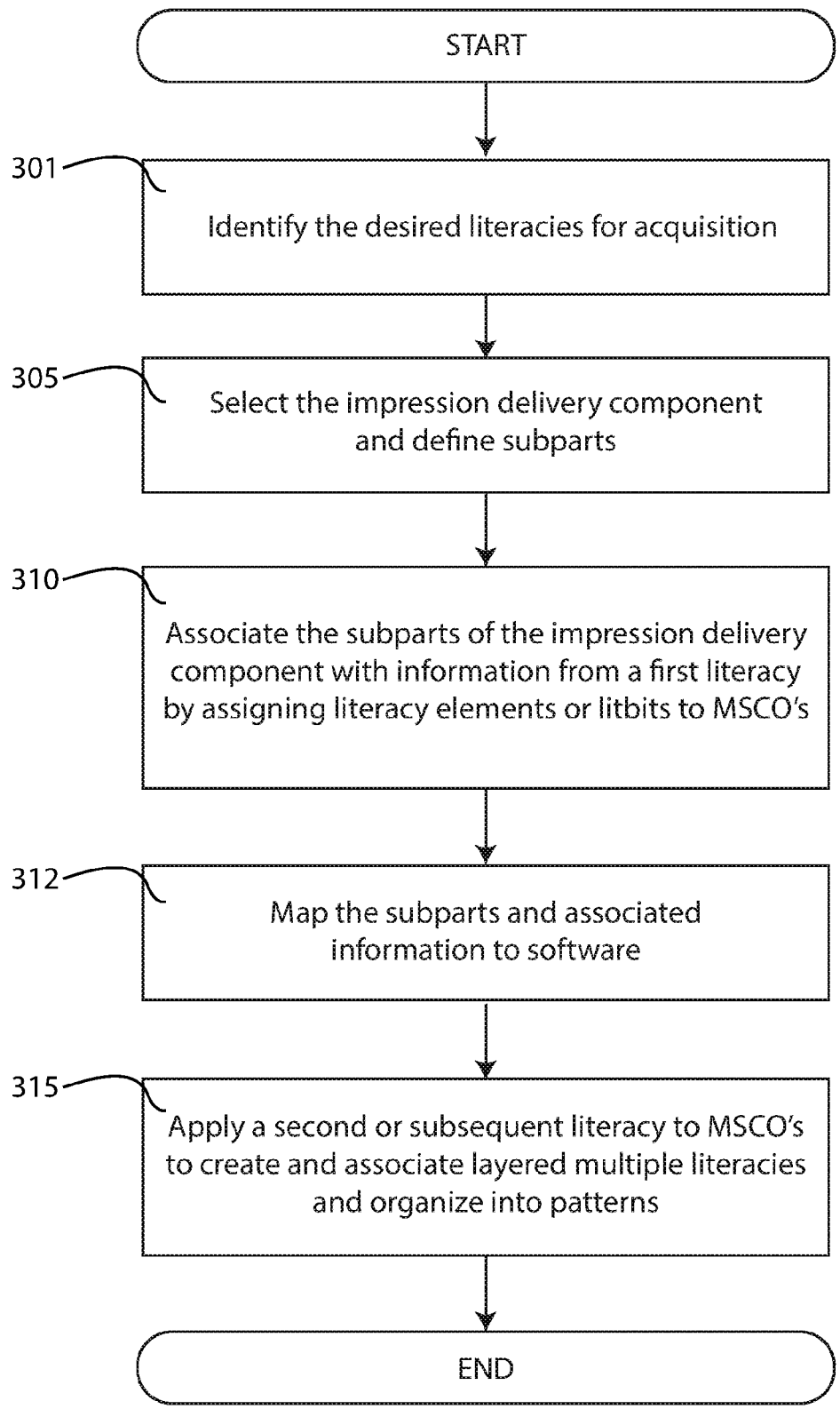
Figure 4A:
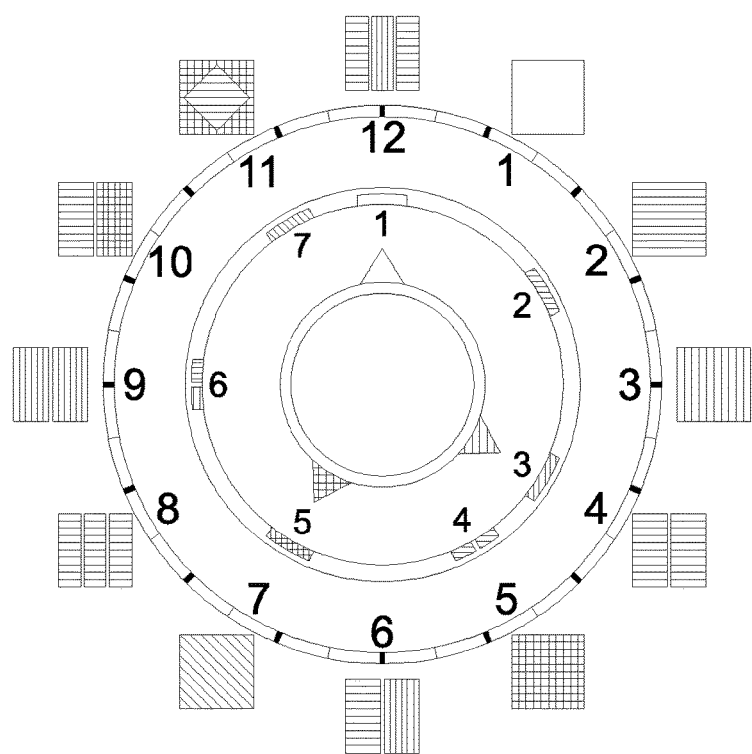
FIGS. 4 (*a-d*) show different embodiments of the impression delivery component (clock form basic construct and periodic table basic construct) and the integration device (guitar and piano keyboard), and their respective interface with the interactive display.
Figure 4D:
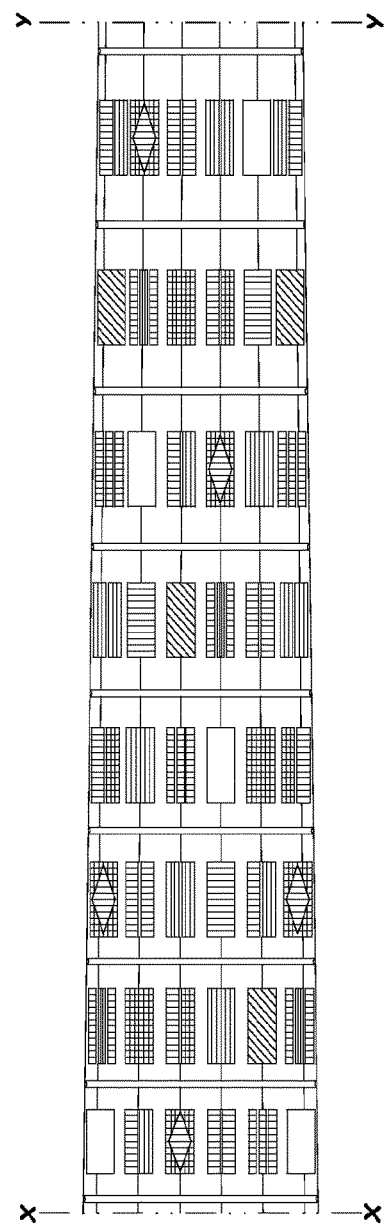
Figure 4B:
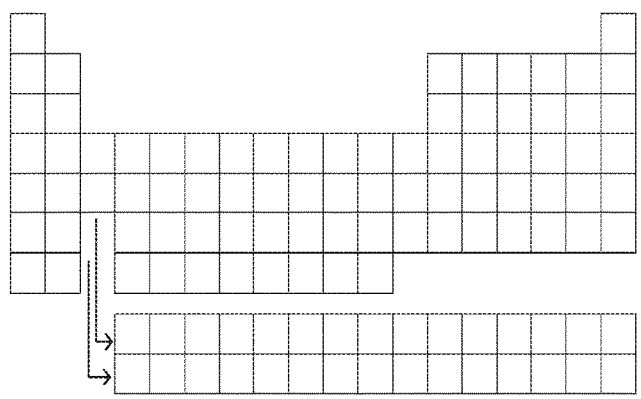
Figure 4C:
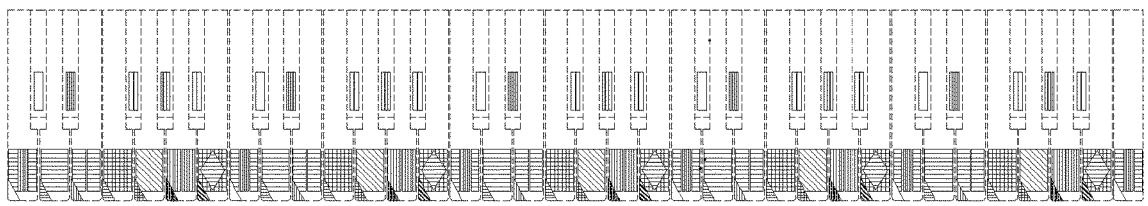

In order to extend and expand this example of the method and apparatus comprising the system as disclosed, in this embodiment music notes used as litbits 30 can be incorporated with the color and math litbits 30; auditory sensory connections are made by associating audio input with a color by visual input, and mathematical literacies by adding numerical values. Since music theory is centered on a base 12 system (chromatics) with embedded patterns of 7 (diatonics), this color system can be applied to music theory as well as pure mathematics. FIG. 2(g) extends the literacy stacking by adding the diatonic interval relationships between notes, scales and chords based on music theory. Similar to the stacking in rows of 6 columns, stacking can occur in series of 12 units in order to bring in music as a literacy targeted for acquisition, since music is based on a 12-tone system, as shown in FIG. 2(h). Color blocks, chromatic and diatonic shapes, exponential circles, binary logs or dice are examples of litbits 30 that can be associated with integers, note names, and their corresponding tones, as further illustrated through FIGS. 2 (a-h).

Once the initial information has been organized and assigned to litbits 30, individual litbits 30 are combined into multi-sensory cognitive objects (MSCO's) 32 to make cognitive impressions that are experienced in more than one sensory dimension. The learner is then immersed in these MSCO's 32 by featuring them in games, lessons and learning modules presented in multi-sensory environments, developing recognition and associations for memory retention and complex cognition. Experiential associations provided in the various environments creates recognition of the literacy components. The impression delivery component 25 then presents the associated impressions to the learner; the quantity and quality of impressions, in the form of complex MSCO's 32 presented, is tracked and analyzed to determine the best sensory approach for optimized learning as described FIG. 7. The Stream Engine 10 pivots, re-presenting the information, but directing impressions in alternate sensory pathways 60 as described in FIG. 8.

In FIGS. 3(a-g), the clock embodiment of the impression delivery component 25 is depicted, and illustrates the layering of information from a basic construct form. A circular clock format is introduced in FIG. 3(a) that blends visual cues with mathematics and music as described herein. In FIG. 3(b), colored blocks are paired with the Arabic numerals 1 through 12 at their corresponding positions on the clock, with 12 at the north position (0 degrees), 1 at 30 degrees, 2 at 60 degrees and so forth in 30 degree increments. These are the 12 "chromatic" values of the clock. The inner ring contains colored bars representing diatonic intervals 1 to 7, where the bars correspond to the respective color blocks. In this illustration, the 7 diatonic positions correspond with chromatic positions 12, 2, 4, 5, 7, 9, and 11.

Harmonic hands, placed on the clock at specifically positioned intervals, are used as constructs for determining the chord values underlying music's rhythm and melody. They are both geometric and color coded. In this example, a C major triad is depicted: the harmonic $1^{st}$/root note of the chord is 12(C) which has a white (1) hand pointing to 12, the harmonic $3^{rd}$ of the chord is 4(E) which has a red (3) hand pointing to 4, and the harmonic $5^{th}$ of the chord is 7(G) which has a yellow (5) hand pointing to 7. The outer rim of the clock can also count beats to incorporate tempo. It can be subdivided based on the song or need of the user. This example uses bold lines to subdivide quarter notes, semi-bold lines to subdivide $16^{th}$ notes, semi-fine lines to subdivide $32^{nd}$ notes & fine lines to subdivide $64^{th}$ notes. Alternately, it could be used to represent whole notes, quarter notes, $8^{th}$ notes & $16^{th}$ notes. It is customizable for unique tempos, time signatures & user needs.

In FIGS. 3 (a-g), three clock hands indicate relative intervals. Hatch patterns throughout this figure are consistent with and represent the same colors as those used in FIG. 2. The root 1st (white), 3rd (red), and 5th (yellow) intervals in a 3-note chord, also known as a triad, are shown. The hands in the figure point to chromatic 12, 4, and 7, constructing what is commonly known as a C major chord, which is the root chord in the key of C. It is the 12 Chord in the key of 12 in the present system. The outermost ring can animate to show time cycling at a designated tempo by the segmented steps lighting up. This can be used as a visual metronome. Time cycling, tempo, or similar spatial and temporal relationships are perceived and reinforced as the rings and hands move around the clock. In FIG. 3b, 12 chromatic blocks are added at the 12 corresponding positions around the clock. This set of indicia represents a unique literacy set. As new indicia sets are assigned to the corresponding numbers 1-12 and spatial positions around the clock, equivalencies are established between literacy symbols and other established literacies such as those associated with math, music, and language concepts and representations. In FIG. 3(c) binary literacy indicia is added to the 12 clock positions. Black ovals represent 0, white ovals represent 1. They are combined to form 4-bit binary representations of numbers 1-12. Moving to FIG. 3(d), English words for numbers 1-12 are added to the 12 positions around the clock. Once recognition is established, Spanish words for numbers 1-12 can be added to the 12 positions around the clock, as shown in FIG. 3e. Extending the literacy stacking even further, in FIG. 3(f) musical note names are added to the 12 corresponding positions around the clock. In FIG. 3(g), the first (white) clock hand rotates clockwise two positions. $3^{rd}$ (red) hand rotates clockwise one position, and $5^{th}$ (yellow) hand rotates clockwise two positions. They now point to Chromatic 2, 5, 9 which make what is commonly known as a D minor chord, the ii chord in the key of C. It is the "2 Chord in the key of 12" in our system.

The clock itself is experienced by the learner either as a self-standing device or projected on an interface, as a series of continuous impressions which are capable of modification based on the learner's expressive behavior. The learner sees the notes and chords in colors and patterns and recognizes the associated mathematical connection while hearing the notes and chords the math and colors represent. The clock's animated hands move with the learner's expressive behavior, and the performance, or the series of expressions in response to the environment, are logged. This is active learning within the system. Alternatively, the learner can experience a performance and learn expressive behavior by watching and listening to the movement of the clock and the sounds and tonal intervals in a passive learning environment.

Using the clock as the impression delivery component 25 additionally allows for incorporation of diatonic patterns, harmonic patterns and rhythmic counting and time elements. Diatonic color constructs determine which patterns of 7 out of 12 are used to determine things like scales. The example in FIGS. 3(*a-g*) illustrates a C major scale. Chromatic 12(C)=Diatonic 1(I), Chromatic 2(D)=Diatonic 2(ii), Chromatic 4(E)=Diatonic 3(iii), Chromatic 5(F)=Diatonic 4(IV), etc. In this example, we used a double blue construct as Diatonic 4(IV) but other color combinations can be applied. This holds true for Diatonic 6(vi) as well; while this example uses a blue/red construct, other possible constructs, for example purple (red mixed with blue) as a Diatonic 6(vi), or colors such as orange (red mixed with yellow) could be used.

FIG. 3(*h*) is a block diagram of a representative computer configuration on which the method of the invention can run. Desired literacies for acquisition are identified 301. An impression delivery component 25 is selected and subparts are defined 305. Subparts of the impression delivery component 25 are assigned to portions of the information identified in a first literacy group 310; the subparts and their associated information are mapped to software integrated into the hardware connected with the system 312. Then, a second and subsequent literacies can be applied to the system 315 and integrated into the mapped content 312. This can be repeated indefinitely until multiple literacies are incorporated.

FIGS. 4 (*a-e*) show the various components of the integrated system. FIG. 4(*a*) illustrates the impression delivery component 25 in the form of a diatonic and chromatic clock that is connected to or integrated with the STREAM Engine 10, which is also connected to an integration device such as an IMI 20 capable of interacting with the system as well as the learner. In this example a guitar with imbedded indicia consistent with the indicia on the clock serves as the IMI 20. The hatch patterns on the figures represent the various colors associated as litbits. FIG. 4(*b*) illustrates an alternative embodiment of an impression delivery component 25. FIG. 4(*c*) shows a keyboard utilized as the IMI 20, and FIG. 4(*d*) shows a guitar fretboard component of the IMI 20. Although a guitar fretboard and piano keyboard are presented in these drawings, any instrument or other device capable of integration by being labeled with the indicia and recognized by the STREAM Engine 10 are contemplated by this disclosure.

The IMI's 20 shown in FIGS. 4(*c*) and (*d*) contain an inlay or overlay affixed to or embedded within it, and are used by the system to log the learner's response, or expressions, to the impressions presented by the impression delivery component 25. A periodic table configured to conform to the pre-defined numerical and color patterns serves as a literacy platform for incorporating sensory-targeted information in the alternate embodiment shown in FIG. 4(*b*). Although a clock and a periodic table are presented as the impression delivery components 25, the associations between the various litbits 30 and MSCO's 32 may be made with a variety of devices specific to the learning environment; that is to say the system can be used with a variety of impression delivery components 25 of various output constructs depending on what is being taught. Familiar and lesson-appropriate objects such as the periodic table of elements, or even defined spatial areas such as courts, tables or boards, etc., can be employed to simultaneously deliver multiple cognitive objects perceived by a plurality of sensory pathways. Common objects appropriate to the learning environment may be inlaid, overlaid or otherwise marked or labeled so that information can be organized and stacked upon the impression delivery component 25 framework and connected with the STREAM Engine 10.

The various sensory pathways 60 that are featured in specific learning environments can be developed consistent with any course or lesson plan. The learner engages the system by actively participating in the experience presented in the environment. Featured content is presented in the form of a game or learning exercise that targets one or more specific senses. Examples of targeted sensory pathways 60 are shown in FIG. 1 for tactile, represented by the hand, which might be particularly adapted for visually or audiologically challenged individuals; visual, represented by the eye; and audio, shown as a speaker. Each of these individual learning environments can feature one or multiple sensory pathways 60, with the capacity for increasing complexity as these sensory pathways 60 are combined and integrated.

The clock and the IMI 20 in these embodiments are marked with matching indicia and corresponding color patterns. They are both connected to, or otherwise integrated with, the STREAM Engine 10 and the interactive display 26. The clock's hands, perceived through the output display, move to the correct note and chord positions as a piece of music is simultaneously played; the learner listens to (passive engagement) or plays (active engagement) the instrument, moving forward through the musical composition. The learner's played notes or chords are logged as expressions by the STREAM Engine 10, and can be tracked, displayed, and analyzed by the expression analysis component 50. The musical composition can be repeated, and the mathematical, tonal, color, or other experiential aspects can be emphasized or enhanced responsively to iterate and reiterate the appropriate response. In this way, distinct sensory pathways 60 can be targeted and the litbits 30 associated with those senses can be interchanged. As the learner becomes more proficient in correctly associating the math, tones and visual patterns and integrating them with the instrument, more complex associations (for example rhythmic and transpositional variations) can be incorporated. Other MSCO's 32 can then be introduced. Furthermore, the system is capable of layering the associations; focus or attention can be given to a particular association while subliminally, the objects that are not in focus are still being observed by the learner. The STREAM Engine 10 utilizes the logged and analyzed data captured and stored in the data storage and sorting component 40 to pivot the particular associations as impressions presented to and observed by the learner in a subsequent iteration in order to target the learner's optimal response. Psychomotor as well as cognitive skills are, as a direct result of utilization of the system, acquired and expanded. Density of literacy acquisition and multi-sensory perception can be scaled up or down by varying the impressions and expressions to meet the needs and skill development goals of the learner.

Figure 5A:
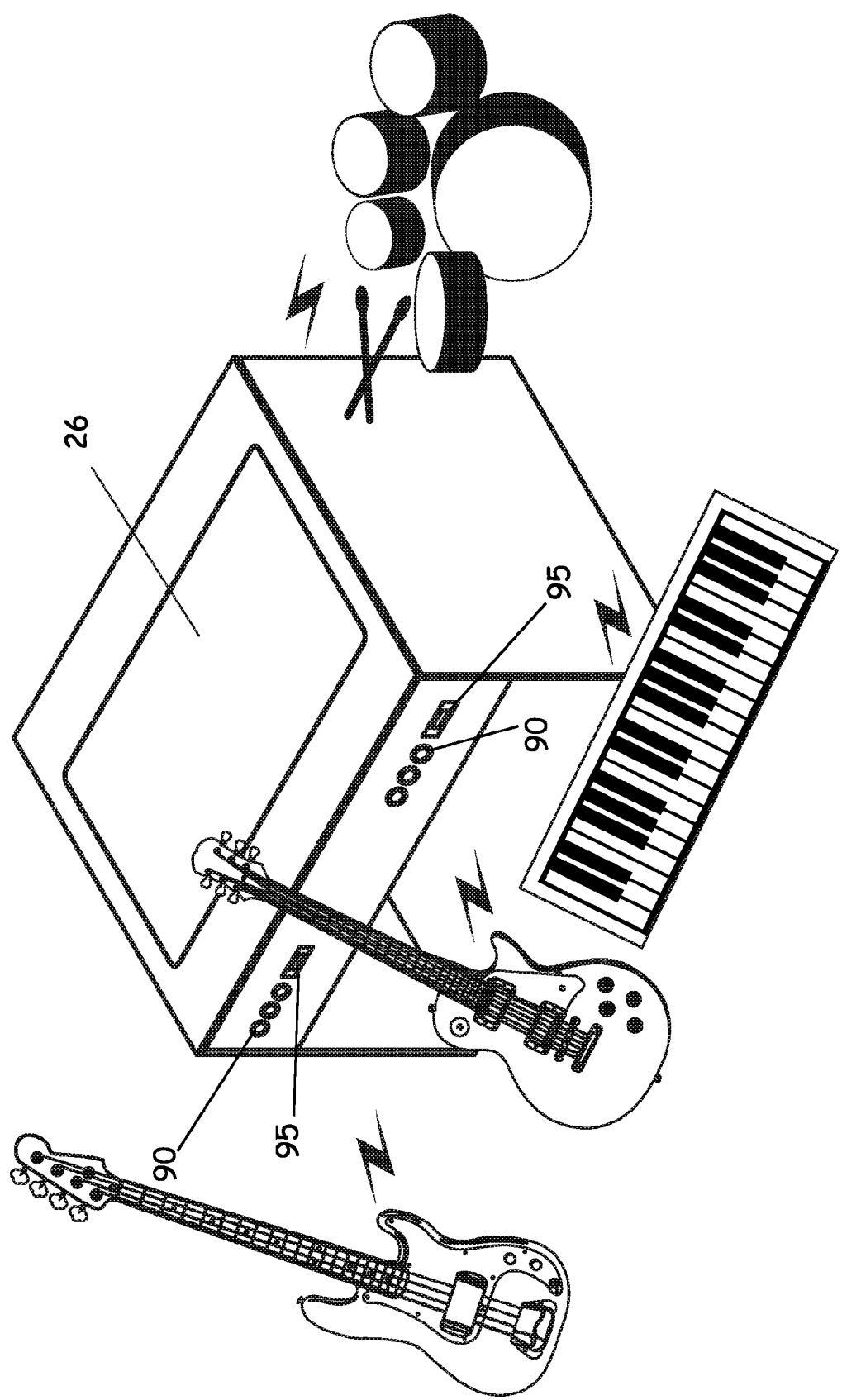
FIGS. 5 (*a-b*) show alternate embodiments of the interactive display and its interaction with the impression delivery component and integration device, utilizing (a) an integrated touch table capable of multiple instrument input; and (b), an interactive touchscreen with an auxiliary interactive display as the interface and multiple connected instruments.
Figure 5B:
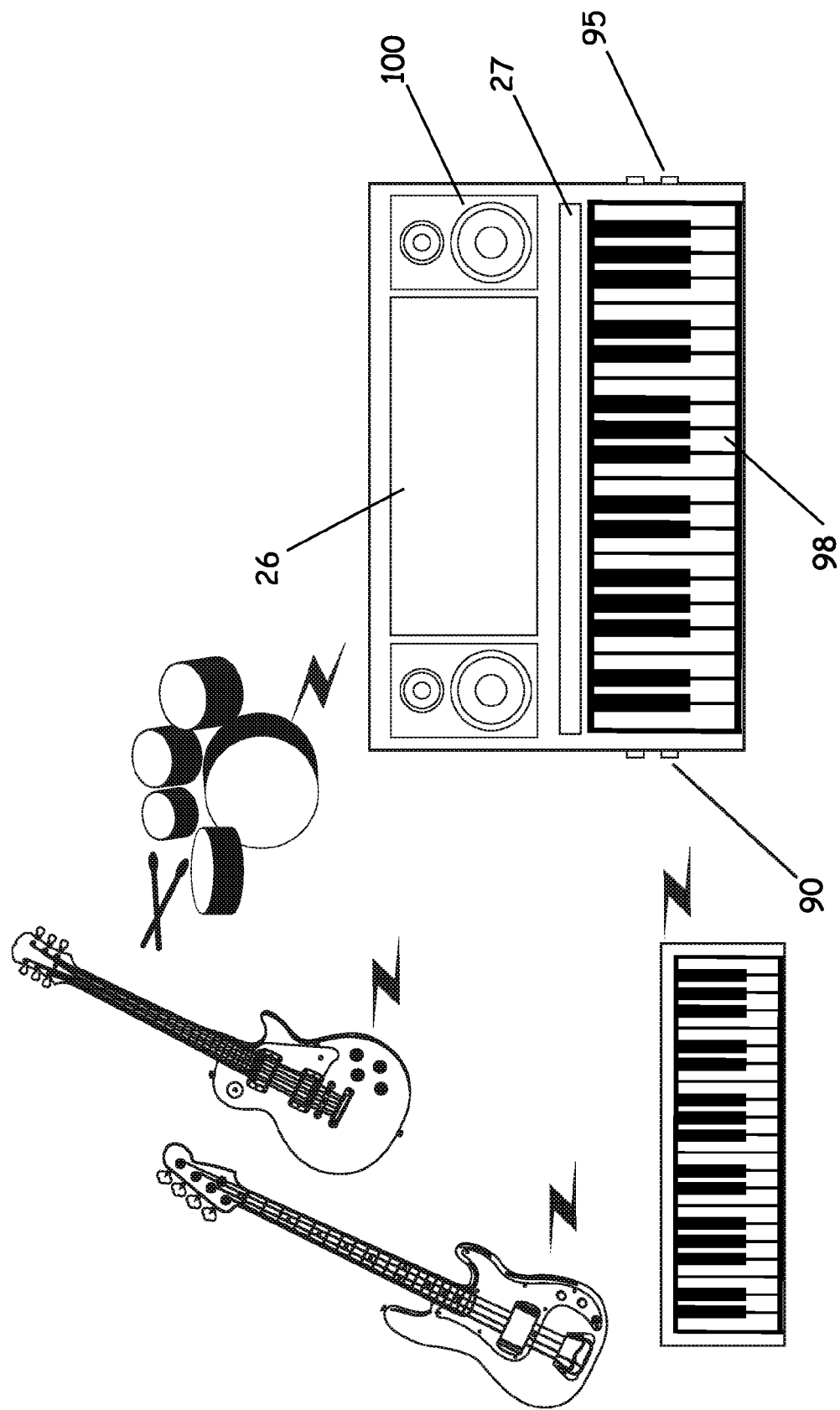

FIGS. 5(a-b) shows embodiments of the IMI 20 or other integration devices as previously described connected through a shared interface. A plurality of individuals can connect to the interactive display 26, either in the same physical location, or online or otherwise virtually connected. The interactive display 26 may comprise a screen, touchpad or touch table, computer, tablet, mobile device, or interface in a virtual or augmented environment. Devices can be plugged in through input connection ports 90 or attach via Bluetooth or other online connectivity. FIG. 5(a) shows a touch table with multiple input/output ports 95 for connecting learners and the system's hardware. An alternate embodiment of the interface is shown in FIG. 5(b), which further depicts speakers for audio output 100, an integrated keyboard playing surface 98 and an auxiliary interactive display 27 capable of assigning indicia to the individual keys on the keyboard. By placing the auxiliary interactive display 27 adjacent to the keyboard, assignment of indicia is simple and can be easily modified. Input/output ports 95 connect audio, visual, haptic or other sensory cues. In this way a band or musical collaboration, or others learning together in any literacy area can share the learning experience in real time.

The learner can watch, listen, feel, or otherwise participate with the system through the connected devices. As the user develops experience within the system, it tracks and develops an adapting, optimized sensory profile that is specific to the individual and his or her best learning style as described with respect to FIG. 8.

Figure 6:
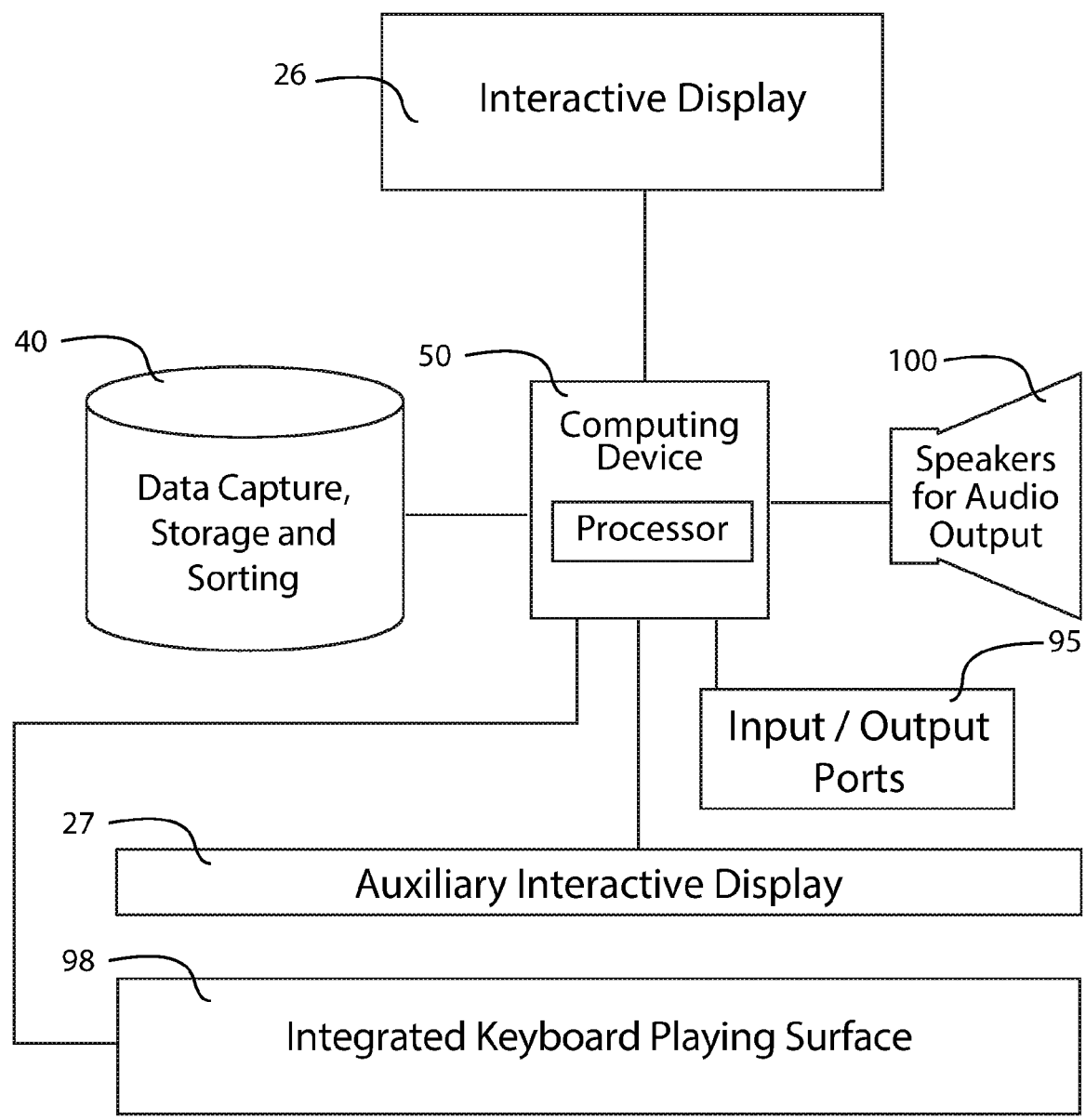
FIG. 6 is a block diagram illustrating an embodiment of an integration device utilizing an integrated keyboard playing surface with connections to the STREAM Engine and interactive and auxiliary interactive displays.

In FIG. 6, a block diagram of one embodiment of an integrated musical instrument, IMI 20 is shown. In this embodiment, an all-in-one device such as that shown in FIG. 5(b) is contemplated. A computing device housing one or more processors 50 signals one or more components including but not limited to an interactive display 26, speakers for audio output 100 and data capture, storage and sorting components 40, each configured to respond to computing device. Auxiliary interactive display 27 is located proximally to integrated playing surface 98, functioning to assign keys to various information. This allows the keyboard or other IMI 20 to be changeable, programmable and therefore adaptable to changing content and able to assign content to keys, blocks or other components.

In a preferred embodiment of the IMI 20 an interactive display 26 serves as both an output and input device, so that the learner can assign and readily change settings, environments, or other aspects of the system. A one or more impression delivery components 25 can be displayed upon a touch actuated, interactive display 26. The integrated keyboard playing surface 98 can be replaced or augmented with a second instrument, for example, digital fretboards or percussion instruments could be displayed. Also, a first input device could be an IMI 20, and one or more subsequent input or output devices such as a wearable haptic actuator could be attached through input/output ports 95.

Figure 7A:
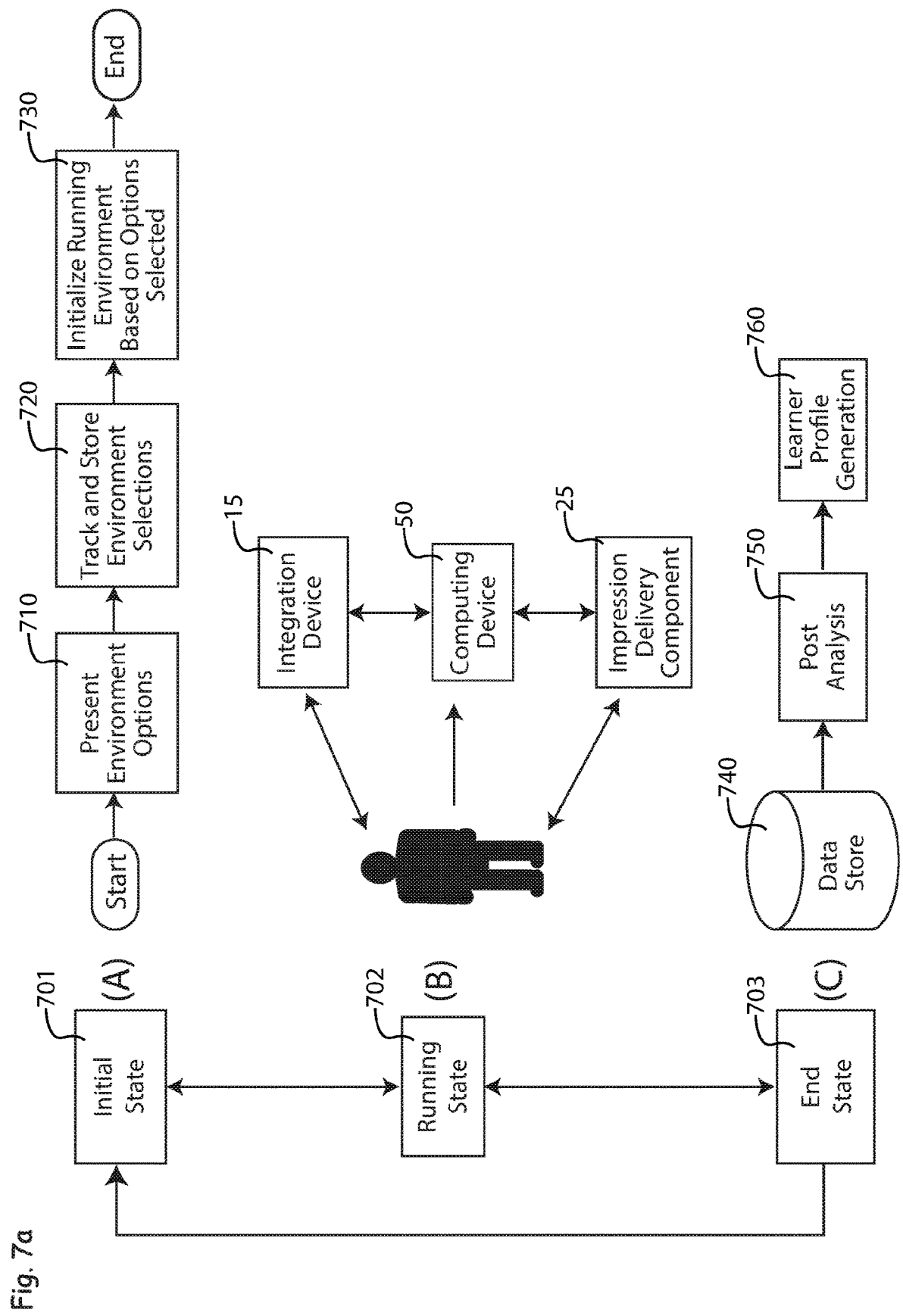

FIGS. 7(a-c) show the code flow through the system, from initial state 701 through running state 702 to end state 703. In FIG. 7(a), user initiation begins at the initial state 701. The learner launches an environment based on the learner's subject matter preference. Environmental options are presented 710, and the user selects which environment to run. The environments the learner selects and experiences are tracked and stored 720. Running environment is then initialized based on environmental options selected 730. In FIG. 7(b), the running state 702 of the system is depicted. A learner interacts with the system by experiencing an environment delivered through a computing device comprising one or more processors 50, connected with an integration device 15, and reacts to the information delivered by performing expressive behavior upon an impression delivery component 25. Data pertaining to the information delivered and related expressive behavior is captured and stored. In the end state 703, tracked and captured data from data store 740 runs through post analysis 750 where behavior is analyzed to determine the most successful one or more sensory pathways. The data generated from this process is used to generate learner profile 760.

FIG. 7(b1) further illustrates the learner's interaction with a computing device. A learner plays within the environment selected. The learner reacts to stacked information, presented in the form of stimuli delivered utilizing an integration device 15, with expressive behavior. Expression 775 in the form of expressive behavior is captured. Expression 775 along with data tracked from the integration device 15 is delivered as expression input 770 to the computing device for processing in the one or more processors 50 within the computing device. The computing device processes and modifies impressions for subsequent presentation to the learner; modified or new information is delivered to the learner using the integration device 15. The learner reacts to the new or modified impressions with continuously improving expressive behavior. As shown in FIG. 7(b2), integration device 15 delivers expression input 770 to the computing device for expression processing 773. In the one or processors 50 within the computing device, expression input 770 data is analyzed, tracked and stored. Impression 780 is then modified by impression processing 783, which returns modified or additional impression output 790 to impression delivery component 25 and integration device 15. Second or subsequent rounds of information is presented to the learner, through different or multiple sensory pathways and expressive behavior is again captured, and returned through the system.

FIG. 7(b3) shows impression 780 to, and expression 775 from, the user through the impression delivery component 25. The tracked expressive behavior is received from the impression delivery component 25 as expression input 770 and processed by the system. Data is processed and normalized through one or more processors 50 in the computing device. The normalized data is analyzed, tracked, and delivered to the learner. The computing device sends modified impression output 790 to the impression delivery component 25 for delivery to the learner as impression 780.

Figure 7C:
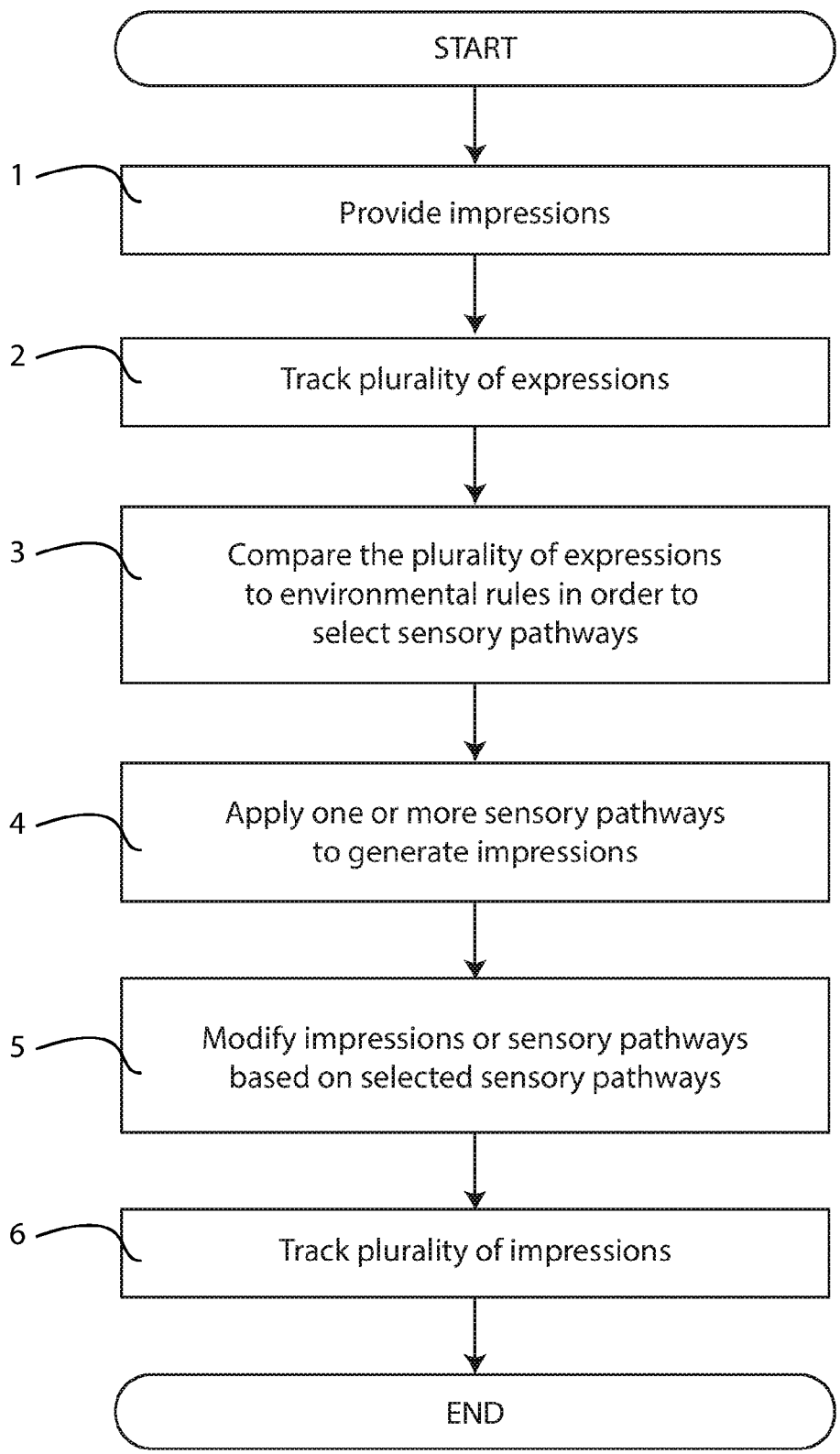

In FIG. 7(c), the analysis process of the system is shown. After startup, (1) impressions are provided to the learner. (2) The system tracks a plurality of expressions made by the learner. (3) The plurality of expressions are compared to environmental rules in order to select one or more sensory pathways appropriate for information delivery. (4) These sensory pathways are applied to generate impressions. (5) Impressions are modified based on changed sensory pathways. (6) A plurality of modified impressions are then provided and tracked.

FIG. 8 shows the learning acquisition process as presented, captured, and represented to the learner to determine the best sensory pathways 60 for learning. (A) first round of stimuli in the form of impressions is delivered to one or more learners; in this example Learner A and Learner B are presented with audio, visual and tactile impressions represented by the speaker, the eye and the hand respectively.

Impressions correspond to the information desired to be learned; they are presented through content in experiential lessons that are qualitatively and quantitatively tracked and ranked for difficulty. Response data is tracked, logged and compared. (B) Expressive behavior in response to the impressions is captured and separately logged for each sensory pathway, and compared to predefined metrics, correct responses or expressive behavior of other learners. Data is normalized and analyzed to identify learner strengths and weakness, and content is adjusted to target strengths and correct or avoid weak sensory pathways 60. (C) A second or subsequent round of stimuli is delivered as a new or modified set of impressions, focusing on a different sensory pathway 60. Information and comparative data is also tracked and analyzed against the first set of responses. Through subsequent rounds of impression delivery and expression capture, the learner's sensory pathways 60 that capture and respond to the information most efficiently are identified (D). This learner-specific responsive data is compiled into an individual learner profile 80 that can be refined through continuous use.

FIG. 9 illustrates an embodiment of a learner interface portal. The portal allows data collected from the system to be displayed and compared to various metrics or other individual performance. Tracking and expression feedback captured and stored by the system is displayed 920. Both qualitative and quantitative information can be extracted and presented. Examples of possible data analyzed by the system and presented to system users, including but not limited to instructors, students, parents or administrators, is depicted. One skilled in the art would recognize that presentation could take many forms, and information displayed could be tailored to a variety of desired learning outcomes. Exemplary data presentation as shown in FIG. 9 includes identification of the instructor and the learner 930, information related to the current lesson 940, time spent and progress made with specific senses 950, impression and expression quantification, and specific literacy acquisition progress 960. This list is by way of example only, and does not limit the possible embodiments of data presentation. From this data, specific learner profiles 80 for one or multiple individuals are derived.

While the description above discloses preferred embodiments of the present invention, it is contemplated that numerous variations and modifications of the invention are possible and are considered to be within the scope of the claims that follow.

We claim:

1. A method of multi-sensory intelligence acquisition, comprising:
    identifying information for acquisition from a desired one or more literacies;
    generating an impression delivery component including a plurality of constructs incorporated into an object that is subdivided into subparts, each subpart of the object:
        being assigned a prime or non-prime integer or multiple of an integer;
        being associated with respective information to be displayed;
    organizing the information by associating it with or assigning it to subparts of the impression delivery component and arranging it into stacked patterns;
    displaying the impression delivery component through a plurality of sensory pathways;
    capturing and tracking expression data associated with the displaying of the impression delivery component;
    analyzing the expression data;
    based on the analyzing of the expression data, at least one of:
        modifying the information being associated with the impression delivery component; and
        modifying at least one of the plurality of sensory pathways;
    displaying and tracking expressions associated with at least one of:
        the modified impression delivery component and the plurality of sensory pathways with the modified at least one sensory pathway; and
    generating a learner profile from captured, tracked and analyzed behavior capable of identifying one or more sensory pathways for learning.

2. The method of claim 1, wherein capturing and tracking of expression data comprises:
    selecting an integration device, further comprising an interface capable of capturing expression in a plurality of sensory pathways;
    associating information for acquisition from a desired one or more literacies with expressive behavior and assigning performance metrics to the integration device;
    capturing, tracking and storing expressive behavior upon the integration device;
    presenting expressive behavior and associated information to a learner through one or more sensory pathways.

3. The method of claim 2, wherein assigning performance metrics includes defining rules based on expressive behavior, the metrics being configured to be used to assess a learner's understanding of the information, and mapping metrics and rules to software integrated into the hardware connected with the system.

4. The method of claim 2, wherein the analyzing of the expression data includes:
    identifying desired physical, cognitive, or psychomotor behavior acquisition and establishing performance metrics on the basis of expressive behavior, wherein the performance metrics are capable of assessing the learner's understanding of the information;
    and tracking and comparing the tracked and captured expression data of the user's performance to the performance metrics; and
    delivering the information and its associated numerical and organizational data to a learner or other user by presenting it physically or electronically upon an output device or interface.

5. The method of claim 2 wherein the object used for the impression delivery component comprises a clock with subparts defined by at least the 12 positions of the clock's face; a plurality of hands that are animated by STREAM Engine software to indicate relative intervals; rings animated to show time cycling, tempo, or similar spatial and temporal relationships; and a set of indicia assigned numerical and literacy information.

6. The method of claim 2 wherein organization of information is accomplished by stacking information in patterns linearly arranged in columns of 6 rows or radially in lines of 12 and associating the information with a set of indicia assigned numerical and literacy information.

7. The method of claim 1, wherein the displaying of the impression delivery component through the plurality of sensory pathways includes mapping software integrated into hardware connected with the system and delivering the information and its associated numerical and organizational data to a learner by presenting it physically or electronically.

8. The method of claim 1, wherein modifying of the integration device or at least one sensory pathway further comprises:
- presenting information and associated numerical and organizational data to one or more learners actively or passively through one or more rounds of stimuli to establish recognition of information and associated data;
- tracking and storing the one or more learner's performance according to pre-established performance metrics;
- analyzing and identifying specific sensory pathways where performance is enhanced, deficient or varies from that desired based on pre-established performance metrics;
- reintroducing information through stimuli presented in a single or plurality of sensory pathways and capturing performance data to identify strengths and weakness in each of the sensory pathways until expressive behavior is consistent with desired performance metrics;
- stacking more complex information or different or multiple literacies in one or more sensory pathways upon previously established patterns associated with the integration device;
- presenting stacked, more complex information or different multiple literacies to the one or more learner.

9. The method of claim 1, wherein generating a learner profile is implemented by comparing data collected on physical, cognitive, or psychomotor performance relative to pre-established performance metrics in one or a plurality of sensory pathways.

10. The method of claim 1 wherein the information comprises at least the literacies of math, music, and one or more languages.

11. The method of claim 1 further comprising a set of indicia assigned numerical and literacy information by:
a. Arranging a series of prime and non-prime numbers numerically in a series;
b. Associating color blocks with the prime numbers;
c. Associating color blocks with factoral forms of the prime numbers in (a) with non-prime numbers and multiples of non-prime numbers represented by and equal to the associated factoral forms;
d. Organizing information into stacked patterns created by stacking the information in infinitely expanding rows of 6 columns starting with the prime number 2, or radially along 12 infinitely expanding lines, according to the linear position of the integer associated with the information.

12. An apparatus, comprising:
An impression delivery component further comprising a familiar and lesson specific object divided into subparts and labeled with indicia incorporating one or more basic constructs, wherein said subparts and respective indicia are associated with information;
An output display connected to one or more impression delivery components, integration devices, and a STREAM Engine;
An integration device capable of interacting with the impression delivery component, the output display, and a STREAM Engine;
A plurality of learning environments connected physically or digitally to a STREAM Engine, further comprising lessons and learning experiences delivered through the impression delivery component and integration device, and also comprising system software capable of communication with a STREAM Engine and delivering content targeted to one or more sensory pathways;
A STREAM Engine comprising processing circuitry, storage and system software that delivers sensory-specific content to learning environments, and captures, stores, and analyzes data including information relevant to specific sensory pathways from one or more impression delivery components and one or more integration devices.

13. The apparatus of claim 12, further comprising processing circuitry configured to
provide a sensory output, the providing of the sensory output includes displaying:
a predefined digital organization of a plurality of visual elements;
a plurality of audio elements, the plurality of audio elements being mapped to the predefined organization of the plurality of visual elements; and
a plurality of tactile elements, the plurality of tactile elements being mapped to the predefined organization of the plurality of visual and audio elements and associated with a portion of the plurality of visual and audio elements;
track a plurality of sounds being played;
display a plurality of movable icons in response to each musical sound being played, each movable icon indicating an element of the plurality of visual, audio and tactile elements;
compare the plurality of musical sounds to a plurality of pre-selected musical sounds;
apply at least one rule to the comparison; and
modify at least one aspect of the sensory output and/or trigger a sensory device based on the applied at least one rule.

14. The apparatus of claim 13 wherein the processing circuitry is further configured to select a plurality of chromatic elements from a table mapping a plurality of prime numbers to a plurality of integers for display, the plurality of integers being represented by at least one of: at least one color and at least one geometric shape.

15. The apparatus of claim 13 wherein the predefined organization of visual elements is organized based on time or music.

16. The apparatus of claim 13, wherein the processing circuitry is further configured to map a plurality of text data to the predefined logical structure.

17. The apparatus of claim 13 further comprising virtual, digital or computer generated instruments on an interactive display, and circuitry programmed to animate the impression delivery component virtual, digital or computer generated instruments in real time.

18. The apparatus of claim 12 wherein the object used for the impression delivery component comprises a clock with subparts defined by at least the 12 positions of the clock's face; a plurality of hands that are animated by STREAM Engine software to indicate relative intervals; rings animated to show time cycling, tempo, or similar spatial and temporal relationships; and a set of indicia assigned numerical and literacy information.

19. The apparatus of claim 12 wherein the impression delivery component object comprises a periodic table of elements.

20. The apparatus of claim 12, further comprising an interactive display interface and an optional auxiliary interface, a computing device further comprising one or more processors, speakers or ports for audio output, one or more ports for communication with one or more impression delivery components, one or more integration devices and a STREAM Engine, and capable of displaying pre-programmed or live streamed content.

21. The apparatus of claim 12, wherein the output display further comprises a touch interface, a plurality of ports to connect multiple learners simultaneously, and an auxiliary interactive display proximally located to an integration device or an impression delivery component to facilitate assignment of litbits and construction of MSCO's.

22. The apparatus of claim 12 further comprising a set of indicia assigned numerical and literacy information by:
   a. Arranging a series of prime and non-prime numbers numerically in a series;
   b. Associating color blocks with the prime numbers;
   c. Associating color blocks with factoral forms of the prime numbers in (a) with non-prime numbers and multiples of non-prime numbers represented by and equal to the associated factoral forms;
   d. Organizing information into stacked patterns created by stacking the information in infinitely expanding rows of 6 columns starting with the prime number 2, or radially along 12 infinitely expanding lines, according to the linear position of the integer associated with the information.

23. The apparatus of claim 12 wherein the integration device comprises one or more integrated musical instruments labeled with indicia conforming to indicia on an impression delivery component; an impression delivery component with indicia conforming to indicia on the integrated musical instrument, one or more ports for electronic or digital connection to an interactive display and other users, and a STREAM Engine capable of capturing expressive behavior.

24. The apparatus of claim 12 wherein the learning environments further comprise lessons and educational materials targeting specific cognitive or psychomotor skills acquisition and capable of delivering information focusing on one or a plurality of sensory pathways while recording expressive behavior in real time.

25. A system for intelligence acquisition from a plurality of sensory pathways, comprising:
   at least one method, further comprising at least:
      identifying desired one or more literacies for acquisition;
      selecting and subdividing an impression delivery component, further comprising a plurality of basic constructs assigned to a prime or a non-prime integer or multiple thereof;
      associating the desired one or more literacies for acquisition with the individual subparts of the impression delivery component and its assigned prime or non-prime integer or multiple thereof, and assigning indicia to the subparts and associated information;
      organizing information by arranging it into stacked patterns;
      connecting an integration device comprising a plurality of constructs with indicia conforming to the indicia of the impression delivery component;
      presenting the impression delivery component and expressions from the integration device to one or more learners through a plurality of sensory pathways and capturing and tracking expression data associated with the displaying of the digital integration device;
      analyzing the expression data and based on the analyzing of the expression data, at least one of:
      modifying the information being associated with the impression delivery component and modifying at least one of the plurality of sensory pathways:
   displaying and tracking expressions associated with at least one of:
      the modified impression delivery component and the plurality of sensory pathways with the modified at least one sensory pathway; and
   generating a learner profile from captured, tracked and analyzed behavior capable of identifying one or more sensory pathways for learning; and
   at least one apparatus, further comprising at least:
      an impression delivery component;
      an output display connected to one or more of impression delivery components, integration devices, and STREAM Engine;
      an integration device capable of interacting with the impression delivery component, the output display, and STREAM Engine;
      a plurality of learning environments connected physically or digitally to STREAM Engine, further comprising lessons and learning experiences and also comprising system software capable of communication with STREAM Engine and delivering content targeted to one or more sensory pathways;
      a STREAM Engine comprising processing circuitry, storage and system software capable of generating a learner profile identifying optimized sensory pathways for learning.

* * * * *